(12) United States Patent
Lapstun et al.

(10) Patent No.: US 8,204,307 B2
(45) Date of Patent: Jun. 19, 2012

(54) METHOD OF IMAGING A CODING PATTERN AND CALCULATING A PERSPECTIVE TRANSFORM USING OPTIMAL NUMBERS OF TARGET ELEMENTS

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1171 days.

(21) Appl. No.: 12/025,754

(22) Filed: Feb. 5, 2008

(65) Prior Publication Data

US 2008/0193053 A1 Aug. 14, 2008

Related U.S. Application Data

(60) Provisional application No. 60/888,775, filed on Feb. 8, 2007.

(51) Int. Cl.
*G06K 9/00* (2006.01)
(52) U.S. Cl. ......... 382/181; 235/454; 235/494; 382/144
(58) Field of Classification Search ................... 382/181
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |
| 5,612,524 A | 3/1997 | Sant Anselmo et al. | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty et al. | |
| 6,330,976 B1 | 12/2001 | Dymetman et al. | |
| 6,515,734 B1 * | 2/2003 | Yamada et al. | 355/54 |
| 6,570,104 B1 | 5/2003 | Ericson et al. | |
| 6,929,186 B2 | 8/2005 | Lapstun | |

(Continued)

FOREIGN PATENT DOCUMENTS

GB 2306669 A 5/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1996, Springer Verlag LNCS 1375, pp. 392-406.

*Primary Examiner* — Gregory M Desire

(57) ABSTRACT

A method of imaging a coding pattern disposed on a surface of a substrate. The method comprises the steps of: (a) positioning a nib of an optical reader on the surface and capturing an image of a portion of the coding pattern; (b) locating at least nine target elements in the imaged portion; (c) observing a perspective distortion of the target elements due to a 3D orientation of the reader relative to said surface; (d) calculating a 2D perspective transform using the target elements; and (e) determining a position of the nib on the surface using the 2D perspective transform and local tag data contained in the imaged portion. The imaged portion of the coding pattern has a diameter of at least one tag diameter and less than two tag diameters. The coding pattern is specially adapted for the method.

7 Claims, 19 Drawing Sheets

U.S. PATENT DOCUMENTS

| | | |
|---|---|---|
| 6,964,374 B1 | 11/2005 | Djuknic et al. |
| 7,264,173 B2 | 9/2007 | Lapstun |
| 7,663,608 B2 * | 2/2010 | Sui et al. ............... 345/173 |
| 7,793,855 B2 | 9/2010 | Lapstun et al. |
| 7,858,307 B2 * | 12/2010 | Ho ............... 435/6.11 |
| 2003/0190056 A1 * | 10/2003 | Metois ............... 382/100 |
| 2003/0197878 A1 * | 10/2003 | Metois et al. ............... 358/1.9 |
| 2004/0173687 A1 | 9/2004 | Lapstun |
| 2005/0273597 A1 | 12/2005 | Lapstun et al. |
| 2006/0013502 A1 | 1/2006 | Weigand |
| 2008/0191019 A1 | 8/2008 | Lapstun et al. |
| 2008/0191038 A1 | 8/2008 | Lapstun et al. |
| 2008/0191040 A1 | 8/2008 | Lapstun et al. |
| 2008/0193007 A1 | 8/2008 | Lapstun et al. |
| 2010/0237145 A1 | 9/2010 | Silverbrook et al. |

FOREIGN PATENT DOCUMENTS

| | | |
|---|---|---|
| WO | WO 99/18487 A2 | 4/1999 |
| WO | WO 99/50787 A1 | 10/1999 |
| WO | WO 00/73983 | 12/2000 |
| WO | WO 2004-038650 A1 | 5/2004 |

* cited by examiner

| A14 | A13 | A12 | A11 | A10 | A9 | A8 | A7 | A6 | A5 | A4 | A3 | A2 | A1 | A0 |
|---|---|---|---|---|---|---|---|---|---|---|---|---|---|---|
| $r_0$ | $r_1$ | $r_2$ | $r_3$ | $r_4$ | $r_5$ | $r_6$ | $r_7$ | $d_0$ | $d_1$ | $d_2$ | $d_3$ | $d_4$ | $d_5$ | $d_6$ |
| redundancy coordinates | | | | | | | | data coordinates | | | | | | |
| | | | | | | | 27 | | | | | data bits | | 0 |

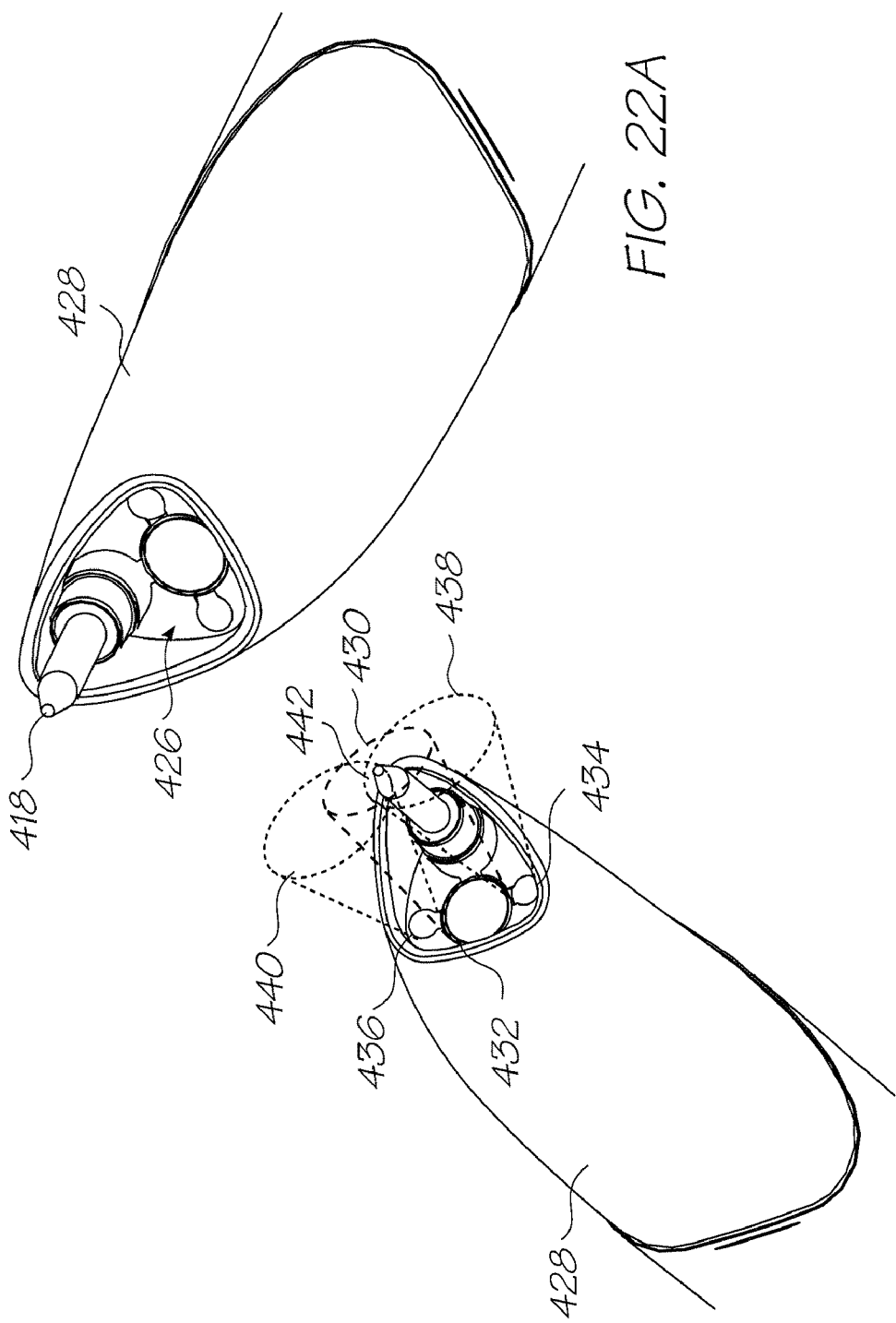

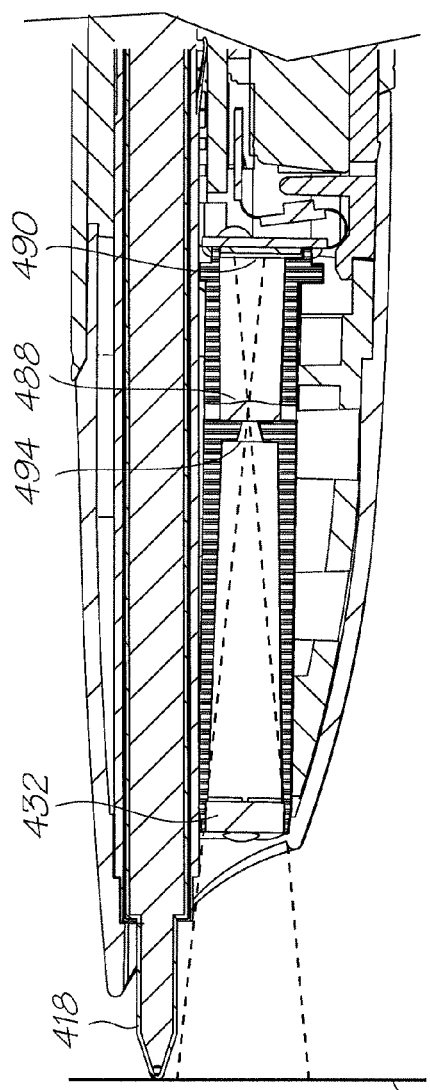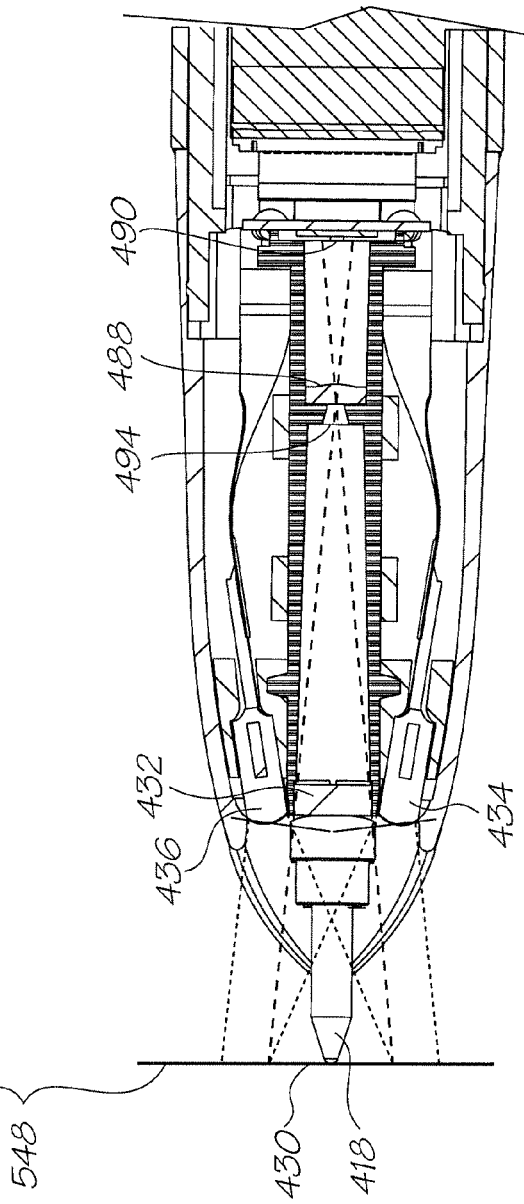

METHOD OF IMAGING A CODING PATTERN AND CALCULATING A PERSPECTIVE TRANSFORM USING OPTIMAL NUMBERS OF TARGET ELEMENTS

COPENDING APPLICATIONS

The following applications have been filed by the Applicant simultaneously with the present application:

| | | | | | | |
|---|---|---|---|---|---|---|
| 8,028,925 | 7,604,182 | 7,905,423 | 8,011,595 | 8,016,204 | 12/025,751 | 7,913,923 |
| 12/025,757 | 7,959,081 | 7,905,405 | 7,905,406 | 12/025,762 | 12/025,764 | 12/025,765 |
| 8,006,912 | 12/025,767 | 12/025,768 | | | | |

The disclosures of these co-pending applications are incorporated herein by reference.

The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | | |
|---|---|---|---|---|---|---|
| 10/815,621 | 10/815,635 | 7,357,323 | 11/488,162 | 7,605,940 | 7,506,168 | 7,905,401 |
| 7,457,961 | 7,457,007 | 7,204,941 | 7,278,727 | 7,423,145 | 7,122,076 | 7,156,289 |
| 7,721,948 | 6,720,985 | 7,295,839 | 7,593,899 | 7,068,382 | 7,094,910 | 7,062,651 |
| 6,644,642 | 6,549,935 | 6,987,573 | 6,727,996 | 6,760,119 | 7,064,851 | 6,290,349 |
| 6,428,155 | 6,785,016 | 6,831,682 | 6,741,871 | 6,965,439 | 7,663,780 | 6,870,966 |
| 6,474,888 | 6,724,374 | 6,788,982 | 7,263,270 | 6,788,293 | 6,737,591 | 7,369,265 |
| 10/778,056 | 10/778,061 | 11/193,482 | 7,055,739 | 6,830,196 | 7,182,247 | 7,082,562 |
| 7,918,404 | 7,108,192 | 10/492,169 | 7,469,062 | 7,359,551 | 7,444,021 | 7,308,148 |
| 6,957,768 | 7,170,499 | 11/856,061 | 7,762,453 | 7,821,507 | 11/754,310 | 12/015,507 |
| 7,148,345 | | | | | | |

BACKGROUND

Field of Invention

The present invention relates to a position-coding pattern on a surface.

The Applicant has previously described a method of enabling users to access information from a computer system via a printed substrate e.g. paper. The substrate has a coding coding pattern printed thereon, which is read by an optical sensing device when the user interacts with the substrate using the sensing device. A computer receives interaction data from the sensing device and uses this data to determine what action is being requested by the user. For example, a user may make handwritten input onto a form or make a selection gesture around a printed item. This input is interpreted by the computer system with reference to a page description corresponding to the printed substrate.

It would desirable to improve the coding pattern on the substrate so as to maximize usage of images captured by the sensing device.

SUMMARY OF INVENTION

In a first aspect the present invention provides a substrate having a coding pattern disposed on a surface thereof, said coding pattern comprising:

a plurality of target elements defining a target grid, said target grid comprising a plurality of cells, wherein neighboring cells share target elements;

a plurality of data elements contained in each cell; and a plurality of tags, each tag being defined by a plurality of contiguous cells, each tag comprising respective local tag data encoded by a respective set of said data elements, wherein each tag comprises at least 9 target elements.

Optionally, each tag comprises at least 16 target elements.

Optionally, each tag comprises at least 25 target elements.

Optionally, each tag is square and comprises $M^2$ contiguous square cells, wherein M is an integer having a value of at least 2.

Optionally, said target elements are configured to facilitate computation of a perspective distortion of said target grid when a portion of said coding pattern is acquired by an optical sensing device.

Optionally, said target elements are sufficiently large to be distinguishable from said data elements by a low-pass filter.

Optionally, said target elements are target dots and said data elements are macrodots.

Optionally, each target dot has a diameter of at least twice that of each macrodot.

Optionally, said macrodots encode data values by pulse position modulation.

Optionally, a n-bit portion of data is represented by a macrodot occupying one of $2^n$ possible positions within a cell, each position representing one of $2^n$ possible data values, wherein n is an integer.

Optionally, each tag comprises a plurality of replications of said local tag data, such that any tag-sized portion of said coding pattern is guaranteed to contain said local tag data irrespective of whether a whole tag is contained in said portion.

Optionally, each tag is square and comprises four replications of said local tag data, each replication being positioned within a respective quarter of said tag.

Optionally, said local tag data identifies a location of a respective tag.

Optionally, each tag comprises common data encoded by a respective set of said data elements, wherein said common data is defined as data common to a plurality of contiguous tags.

Optionally, each cell comprises a fragment of said common data, and contiguous cells are arranged such that any tag-sized portion of said coding pattern is guaranteed to contain said common data irrespective of whether a whole tag is contained in said portion.

Optionally, said common data is region identity data uniquely identifying a region of said surface.

Optionally, said common data uniquely identifies said substrate.

Optionally, each cell comprises orientation data encoded by a respective set of said data elements, said orientation data identifying an orientation of said coding pattern with respect to said surface.

Optionally, each cell comprises translation data encoded by a respective set of said data elements, said translation data identifying a translation of said cell relative to a tag containing said cell.

Optionally, each cell defines a symbol group, each symbol group comprising a plurality of Reed-Solomon symbols encoded by a plurality of said data elements.

In a second aspect the present invention provides a substrate having a coding pattern disposed on a surface thereof, said coding pattern comprising:
- a plurality of target elements defining a target grid, said target grid comprising a plurality of cells, wherein neighboring cells share target elements;
- a plurality of data elements contained in each cell; and
- a plurality of tags, each tag being defined by a plurality of contiguous cells, each tag comprising respective local tag data encoded by a respective set of said data elements, wherein said data elements encode data values by pulse position modulation.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

Optionally, each local codeword identifies a location of a respective tag.

Optionally, each tag comprises one or more common codewords, each common codeword being comprised of a set of said Reed-Solomon symbols, wherein said one or more common codewords are defined as codewords common to a plurality of contiguous tags.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said one or more common codewords encode region identity data uniquely identifying a region of said surface.

Optionally, said one or more common codewords uniquely identifies said substrate.

Optionally, each cell comprises an orientation symbol encoded by at least one data element, said orientation symbol identifying an orientation of said coding pattern with respect to said surface.

Optionally, each cell comprises one or more translation symbols encoded by a respective set of said data elements, said translation symbols identifying a translation of said cell relative to a tag containing said cell.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, said target elements are sufficiently large to be distinguishable from said data elements by a low-pass filter.

Optionally, said target elements are target dots and said data elements are macrodots, and wherein each target dot has a diameter of at least twice that of each macrodot.

In a third aspect the present invention provides a substrate having a coding pattern disposed on a surface thereof, said coding pattern comprising:
- a plurality of target elements defining a target grid, said target grid comprising a plurality of cells, wherein neighboring cells share target elements;
- a plurality of data elements contained in each cell; and
- a plurality of tags, each tag being defined by a plurality of contiguous cells, each tag comprising respective tag data encoded by a respective set of said data elements, wherein each cell comprises at least one orientation symbol encoded by at least one data element, such that any tag-sized portion of said coding pattern is guaranteed to contain a plurality of said orientation symbols, each orientation symbol identifying an orientation of a layout of said tag data with respect to said target grid.

Optionally, each orientation symbol comprises a data element positioned at one of four possible positions within each cell, each position representing one of four possible orientations.

Optionally, each orientation symbol is readable by an optical sensing device at any of said four orientations.

Optionally, each tag comprises N cells, and at least N orientation symbols form an orientation code with minimum distance N, wherein N is an integer having a value of at least 4.

Optionally, said cells are arranged such that any tag-sized portion of said coding pattern is guaranteed to contain said orientation code comprising at least N orientation symbols.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each orientation symbol identifies an orientation of a layout of said Reed-Solomon symbols with respect to said target grid.

Optionally, said tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

Optionally, each local codeword identifies a location of a respective tag.

Optionally, each tag comprises one or more common codewords, each common codeword being comprised of a set of said Reed-Solomon symbols, wherein said one or more common codewords are defined as codewords common to a plurality of contiguous tags.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said one or more common codewords encode region identity data uniquely identifying a region of said surface.

Optionally, said one or more common codewords uniquely identifies said substrate.

Optionally, each cell comprises one or more translation symbols encoded by a respective set of said data elements, said translation symbols identifying a translation of said cell relative to a tag containing said cell.

Optionally, each cell comprises a pair of orthogonal translation symbols, each orthogonal translation symbol identifying a respective orthogonal translation of said cell relative to a tag containing said cell.

In a fourth aspect the present invention provides a substrate having a coding pattern disposed on a surface thereof, said coding pattern comprising:
- a plurality of target elements defining a target grid, said target grid comprising a plurality of cells, wherein neighboring cells share target elements;
- a plurality of data elements contained in each cell; and
- a plurality of tags, each tag being defined by a plurality of contiguous cells, each tag comprising respective local tag data encoded by a respective set of said data elements, wherein each tag comprises a plurality of replications of said local tag data, such that any tag-sized portion of said coding pattern is guaranteed to contain said local tag data irrespective of whether a whole tag is contained in said portion.

Optionally, each tag is square and comprises four replications of said local tag data, each replication being positioned within a respective quarter of said tag.

Optionally, said local tag data identifies a location of a respective tag.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

Optionally, each tag comprises one or more common codewords, each common codeword being comprised of a set of said Reed-Solomon symbols, wherein said one or more common codewords are defined as codewords common to a plurality of contiguous tags.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said one or more common codewords encode region identity data uniquely identifying a region of said surface.

Optionally, said one or more common codewords uniquely identifies said substrate.

Optionally, each cell comprises an orientation symbol encoded by at least one data element, said orientation symbol identifying an orientation of said coding pattern with respect to said surface.

Optionally, each cell comprises one or more translation symbols encoded by a respective set of said data elements, said translation symbols identifying a translation of said cell relative to a tag containing said cell.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, said target elements are target dots and said data elements are macrodots, and wherein each target dot has a diameter of at least twice that of each macrodot.

In a fifth aspect the present invention provides a substrate having a coding pattern disposed on a surface thereof, said coding pattern comprising:
- a plurality of target elements defining a target grid, said target grid comprising a plurality of cells, wherein neighboring cells share target elements;
- a plurality of data elements contained in each cell; and
- a plurality of tags, each tag being defined by a plurality of contiguous cells, each tag comprising respective local tag data encoded by a respective set of said data elements, each tag comprising common data encoded by a respective set of said data elements, said common data being defined as data common to a plurality of contiguous tags, wherein each cell comprises a fragment of said common data, and contiguous cells are arranged such that any tag-sized portion of said coding pattern is guaranteed to contain said common data irrespective of whether a whole tag is contained in said portion.

Optionally, said common data is region identity data uniquely identifying a region of said surface.

Optionally, said common data uniquely identifies said substrate.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said common data is encoded as one or more common codewords, each common codeword being comprised of a set of said Reed-Solomon symbols.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

Optionally, said local tag data identifies a location of a respective tag.

Optionally, each cell comprises an orientation symbol encoded by at least one data element, said orientation symbol identifying an orientation of said coding pattern with respect to said surface.

Optionally, each cell comprises one or more translation symbols encoded by a respective set of said data elements, said translation symbols identifying a translation of said cell relative to a tag containing said cell.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, said target elements are sufficiently large to be distinguishable from said data elements by a low-pass filter.

Optionally, said target elements are target dots and said data elements are macrodots, and wherein each target dot has a diameter of at least twice that of each macrodot.

In a sixth aspect the present invention provides substrate having a coding pattern disposed on a surface thereof, said coding pattern comprising:

a plurality of target elements defining a target grid, said target grid comprising a plurality of cells, wherein neighboring cells share target elements;

a plurality of data elements contained in each cell; and a plurality of tags, each tag being defined by a plurality of contiguous cells, each tag comprising respective tag data encoded by a respective set of said data elements, wherein each cell comprises one or more translation symbols encoded by a respective set of said data elements, said one or more translation symbols identifying a translation of said cell relative to a tag containing said cell.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, M translation symbols in a row of M cells define a cyclic position code having minimum distance M, said code being defined by a first codeword.

Optionally, M translation symbols in a column of M cells define a cyclic position code having minimum distance M, said code being defined by a second codeword.

Optionally, each tag comprises N cells, and at least N translation symbols form a third codeword with minimum distance N, wherein N is an integer having a value of at least 4.

Optionally, any tag-sized portion of said coding pattern is guaranteed to contain at least N translation symbols, thereby capturing said third codeword.

Optionally, each cell comprises at least one orientation symbol encoded by at least one data element, such that any tag-sized portion of said coding pattern is guaranteed to contain a plurality of said orientation symbols, each orientation symbol identifying an orientation of said coding pattern with respect to said surface.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

Optionally, each local codeword identifies a location of a respective tag.

Optionally, each tag comprises one or more common codewords, each common codeword being comprised of a set of said Reed-Solomon symbols, wherein said one or more common codewords are defined as codewords common to a plurality of contiguous tags.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said one or more common codewords encode region identity data uniquely identifying a region of said surface.

In a seventh aspect the present invention provides a method of imaging a coding pattern disposed on a surface of a substrate, said method comprising the steps of:

(a) positioning a nib of an optical reader on said surface and capturing an image of a portion of said coding pattern, said coding pattern comprising:
   a plurality of target elements defining a target grid, said target grid comprising a plurality of cells, wherein neighboring cells share target elements;
   a plurality of data elements contained in each cell; and
   a plurality of tags, each tag being defined by a plurality of contiguous cells, each tag comprising respective local tag data encoded by a respective set of said data elements, wherein each tag comprises at least 9 target elements;

(b) locating at least 9 target elements in said imaged portion;

(c) observing a perspective distortion of said target elements due to a 3D orientation of said reader relative to said surface;

(d) calculating a 2D perspective transform using said target elements; and (e) determining a position of said nib on said surface using at least said 2D perspective transform and said local tag data, wherein said portion of said coding pattern has a diameter of at least one tag diameter and less than two tag diameters.

Optionally, each tag comprises at least 16 target elements and at least 16 target elements are located in step (b).

Optionally, each tag comprises at least 25 target elements and at least 25 target elements are located in step (b).

Optionally, each tag is square and comprises M contiguous square cells, wherein M is an integer having a value of at least 2.

Optionally, step (b) comprises the sub-step of low-pass filtering said captured image so as to obscure said data elements and preserve said target elements.

Optionally, said target elements are target dots and said data elements are macrodots.

Optionally, each target dot has a diameter of at least twice that of each macrodot.

Optionally, said macrodots encode data values by pulse position modulation.

Optionally, a n-bit portion of data is represented by a macrodot occupying one of $2^n$ possible positions within a cell, each position representing one of $2^n$ possible data values, wherein n is an integer.

Optionally, each tag comprises a plurality of replications of said local tag data, such that said tag-sized portion of said coding pattern is guaranteed to contain said local tag data irrespective of whether a whole tag is contained in said portion.

Optionally, each tag is square and comprises four replications of said local tag data, each replication being positioned within a respective quarter of said tag.

Optionally, said local tag data identifies a location of a respective tag.

In a further aspect the present invention provides a system for imaging a coding pattern disposed on a surface of a substrate, said system comprising:

(A) said substrate, wherein said coding pattern comprises:
   a plurality of target elements defining a target grid, said target grid comprising a plurality of cells, wherein neighboring cells share target elements;
   a plurality of data elements contained in each cell; and
   a plurality of tags, each tag being defined by a plurality of contiguous cells, each tag comprising respective local tag data encoded by a respective set of said data elements, each tag comprising at least 9 target elements;

(B) an optical reader comprising:
   an image sensor for capturing an image of a portion of said coding pattern, said image sensor having a field-of-view of at least one tag diameter and less than two tag diameters;
   a nib; and
   a processor configured for performing the steps of:
      (i) locating at least 9 target elements in said field-of-view;
      (ii) observing a perspective distortion of said target elements due to a 3D orientation of said reader relative to said surface;
      (iii) calculating a 2D perspective transform using said target elements; and
      (iv) determining a position of said nib on said surface using at least said 2D perspective transform and said local tag data.

Optionally, each tag comprises at least 16 target elements and said processor is configured for locating at least 16 target elements.

Optionally, each tag comprises at least 25 target elements and said processor is configured for locating at least 25 target elements.

Optionally, each tag is square and comprises $M^2$ contiguous square cells, wherein M is an integer having a value of at least 2.

Optionally, said processor is configured for low-pass filtering said captured image so as to obscure said data elements and preserve said target elements.

Optionally, said target elements are target dots and said data elements are macrodots.

Optionally, said reader is an optically imaging pen.

Optionally, said local tag data identifies a location of a respective tag.

In an eighth aspect the present invention provides a method of imaging a coding pattern disposed on a surface of a substrate, said method comprising the steps of:

(a) capturing an image of a portion of said coding pattern, said coding pattern comprising:
   a plurality of target elements defining a target grid, said target grid comprising a plurality of cells, wherein neighboring cells share target elements;
   a plurality of data elements contained in each cell; and
   a plurality of tags, each tag being defined by a plurality of contiguous cells, each tag comprising respective local tag data encoded by a respective set of said data elements, wherein said data elements encode data values by pulse position modulation; and (b) low-pass filtering said captured image so as to obscure said data elements and preserve said target elements.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each local codeword identifies a location of a respective tag.

In a another aspect the present invention provides the method comprising the further steps of:

observing a perspective distortion of said preserved target elements due to a 3D orientation of said reader relative to said surface; and calculating a 2D perspective transform using said target elements.

In another aspect the present invention provides a system for imaging a coding pattern disposed on a surface of a substrate, said system comprising the steps of:

(A) said substrate, wherein said coding pattern comprises:

a plurality of target elements defining a target grid, said target grid comprising a plurality of cells, wherein neighboring cells share target elements;

a plurality of data elements contained in each cell; and a plurality of tags, each tag being defined by a plurality of contiguous cells, each tag comprising respective local tag data encoded by a respective set of said data elements, wherein said data elements encode data values by pulse position modulation, and (B) an optical reader comprising:

an image sensor for capturing an image of a portion of said coding pattern; and a processor configured for low-pass filtering said captured image so as to obscure said data elements and preserve said target elements.

Optionally, said data elements are macrodots.

Optionally, a portion of data is represented by a macrodot occupying one of a plurality of possible positions within a cell, each position representing one of a plurality of possible data values.

Optionally, a n-bit portion of data is represented by a macrodot occupying one of $2^n$ possible positions within a cell, each position representing one of $2^n$ possible data values, wherein n is an integer.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, said reader is an optically imaging pen having a nib.

Optionally, said processor is further configured for:

observing a perspective distortion of said preserved target elements due to a 3D orientation of said reader relative to said surface; and calculating a 2D perspective transform using said target elements.

In a ninth aspect the present invention provides a method of imaging a coding pattern disposed on a surface of a substrate, said method comprising the steps of:

(a) operatively positioning an optical reader relative to said surface and capturing an image of a portion of said coding pattern, said coding pattern comprising:

a plurality of target elements defining a target grid, said target grid comprising a plurality of cells, wherein neighboring cells share target elements;

a plurality of data elements contained in each cell; and a plurality of tags, each tag being defined by a plurality of contiguous cells, each tag comprising respective tag data encoded by a respective set of said data elements, wherein each cell comprises at least one orientation symbol encoded by at least one data element, each orientation symbol identifying an orientation of a layout of said tag data with respect to said target grid;

(b) sampling and decoding at least three of said orientation symbols contained in said imaged portion;

(c) determining, from the decoded orientation symbols, the orientation of the layout of the tag data relative to the target grid; and (d) using said determined orientation to sample and decode said tag data.

wherein said portion has a diameter of at least one tag diameter and less than two tag diameters.

Optionally, said determined orientation is a maximum likelihood orientation.

Optionally, step (c) further comprises:

determining the orientation of the reader relative to said surface.

Optionally, said tag data identifies a location of respective tag.

Optionally, each orientation symbol comprises a data element positioned at one of four possible positions within each cell, each position representing one of four possible orientations.

Optionally, each tag comprises N cells, and at least N orientation symbols form an orientation code with minimum distance N, wherein N is an integer having a value of at least 4.

Optionally, said cells are arranged such that any tag-sized portion of said coding pattern is guaranteed to contain said orientation code comprising at least N orientation symbols.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each orientation symbol identifies an orientation of a layout of said Reed-Solomon symbols with respect to said target grid.

In a further aspect there is provided a system for imaging a coding pattern disposed on a surface of a substrate, said system comprising:

(A) said substrate, wherein said coding pattern comprises:
a plurality of target elements defining a target grid, said target grid comprising a plurality of cells, wherein neighboring cells share target elements;
a plurality of data elements contained in each cell; and
a plurality of tags, each tag being defined by a plurality of contiguous cells, each tag comprising respective tag data encoded by a respective set of said data elements,
wherein each cell comprises at least one orientation symbol encoded by at least one data element, each orientation symbol identifying an orientation of a layout of said tag data with respect to said target grid;

(B) an optical reader comprising:
an image sensor for capturing an image of a portion of said coding pattern, said image sensor having a field-of-view of at least one tag diameter and less than two tag diameters; and
a processor configured for performing the steps of:
(i) sampling and decoding at least three of said orientation symbols;
(ii) determining, from the decoded orientation symbols, the orientation of the layout of the tag data relative to the target grid; and
(iii) using said determined orientation to sample and decode said tag data.

Optionally, said orientation determined by said processor is a maximum likelihood orientation.

Optionally, said processor is configured to perform the further step of:
determining the orientation of said reader relative to said surface Optionally, said tag data identifies a location of a respective tag.

Optionally, each orientation symbol comprises a data element positioned at one of four possible positions within each cell, each position representing one of four possible orientations.

Optionally, each tag comprises N cells, and at least N orientation symbols form an orientation code with minimum distance N, wherein N is an integer having a value of at least 4.

Optionally, said cells are arranged such that any tag-sized portion of said coding pattern is guaranteed to contain said orientation code comprising at least N orientation symbols.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each orientation symbol identifies an orientation of a layout of said Reed-Solomon symbols with respect to said target grid.

In a tenth aspect the present invention provides a method of imaging a coding pattern disposed on a surface of a substrate, said method comprising the steps of:
(a) operatively positioning an optical reader relative to said surface and capturing an image of a portion of said coding pattern, said coding pattern comprising:
a plurality of target elements defining a target grid, said target grid comprising a plurality of cells, wherein neighboring cells share target elements;
a plurality of data elements contained in each cell; and
a plurality of tags, each tag being defined by a plurality of contiguous cells, each tag comprising respective local tag data encoded by a respective set of said data elements, wherein each tag comprises a plurality of replications of said local tag data;
(b) sampling and decoding said local tag data contained in said imaged portion; and
(c) determining a position of said reader,
wherein said portion has a diameter of at least one tag diameter and less than two tag diameters.

Optionally, each tag is square and comprises four replications of said local tag data, each replication being positioned within a respective quarter of said tag.

Optionally, said local tag data identifies a location of a respective tag.

Optionally, said data elements are macrodots.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, each tag is square and comprises four replications of said local codeword, each replication being positioned within a respective quarter of said tag.

In a further aspect there is provided a system for imaging a coding pattern disposed on a surface of a substrate, said system comprising:

(A) said substrate, wherein said coding pattern comprises:
a plurality of target elements defining a target grid, said target grid comprising a plurality of cells, wherein neighboring cells share target elements;
a plurality of data elements contained in each cell; and
a plurality of tags, each tag being defined by a plurality of contiguous cells, each tag comprising respective local tag data encoded by a respective set of said data elements, wherein each tag comprises a plurality of replications of said local tag data, (B) an optical reader comprising:
an image sensor for capturing an image of a portion of said coding pattern, said image sensor having a field-of-view of at least one tag diameter and less than two tag diameters; and
a processor configured for performing the steps of:
(i) sampling and decoding said local tag data; and
(ii) determining a position of said reader.

Optionally, each tag is square and comprises four replications of said local tag data, each replication being positioned within a respective quarter of said tag.

Optionally, said local tag data identifies a location of a respective tag.

Optionally, said data elements are macrodots.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said local tag data is encoded as a local codeword comprised of a set of said Reed-Solomon symbols.

Optionally, each tag comprises a plurality of replications of said local codeword, such that any tag-sized portion of said coding pattern is guaranteed to contain said local codeword irrespective of whether a whole tag is contained in said portion.

Optionally, said reader is an optically imaging pen having a nib.

In an eleventh aspect the present invention provides a method of imaging a coding pattern disposed on a surface of a substrate, said method comprising the steps of:
 (a) operatively positioning an optical reader relative to said surface and capturing an image of a portion of said coding pattern, said coding pattern comprising:
    a plurality of target elements defining a target grid, said target grid comprising a plurality of cells, wherein neighboring cells share target elements;
    a plurality of data elements contained in each cell; and
    a plurality of tags, each tag being defined by a plurality of contiguous cells, each tag comprising respective local tag data encoded by a respective set of said data elements, each tag comprising common data encoded by a respective set of said data elements, said common data being defined as data common to a plurality of contiguous tags,
 wherein each cell comprises a fragment of said common data;
 (b) sampling and decoding each fragment of common data contained in said imaged portion; and
 (c) assembling said decoded fragments to determine said common data,
wherein said portion has a diameter of at least one tag diameter and less than two tag diameters.

Optionally, said common data is region identity data uniquely identifying a region of said surface.

Optionally, said common data uniquely identifies said substrate.

Optionally, said data elements are macrodots.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said common data is encoded as one or more common codewords, each common codeword being comprised of a set of said Reed-Solomon symbols.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

In another aspect the method further comprising the step of:
 sampling and decoding said local tag data.

In a further aspect there is provided a system for imaging a coding pattern disposed on a surface of a substrate, said system comprising:
(A) said substrate, wherein said coding pattern comprises:
    a plurality of target elements defining a target grid, said target grid comprising a plurality of cells, wherein neighboring cells share target elements;
    a plurality of data elements contained in each cell; and
    a plurality of tags, each tag being defined by a plurality of contiguous cells, each tag comprising respective local tag data encoded by a respective set of said data elements, each tag comprising common data encoded by a respective set of said data elements, said common data being defined as data common to a plurality of contiguous tags,
(B) an optical reader comprising:
    an image sensor for capturing an image of a portion of said coding pattern, said image sensor having a field-of-view of at least one tag diameter and less than two tag diameters; and
    a processor configured for performing the steps of:
       (i) sampling and decoding each fragment of common data visible in said field-of-view; and
       (ii) assembling said decoded fragments to determine said common data.

Optionally, said common data is region identity data uniquely identifying a region of said surface.

Optionally, said common data uniquely identifies said substrate.

Optionally, said data elements are macrodots.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said common data is encoded as one or more common codewords, each common codeword being comprised of a set of said Reed-Solomon symbols.

Optionally, each symbol group comprises a fragment of at least one of said one or more common codewords, and contiguous symbol groups are arranged such that any tag-sized portion of said coding pattern is guaranteed to contain said one or more common codewords irrespective of whether a whole tag is contained in said portion.

Optionally, said reader is an optically imaging pen having a nib.

In a twelfth aspect the present invention provides a method of imaging a coding pattern disposed on a surface of a substrate, said method comprising the steps of:
 (a) operatively positioning an optical reader relative to said surface and capturing an image of a portion of said coding pattern, said coding pattern comprising:
    a plurality of target elements defining a target grid, said target grid comprising a plurality of cells, wherein neighboring cells share target elements;
    a plurality of data elements contained in each cell; and
    a plurality of tags, each tag being defined by a plurality of contiguous cells, each tag comprising respective tag data encoded by a respective set of said data elements, wherein each cell comprises one or more translation symbols encoded by a respective set of said data elements, said one or more translation symbols identifying a translation of said cell relative to a tag containing said cell;

(b) sampling and decoding one or more translation symbols contained in said imaged portion;

(c) determining a translation of one or more cells relative to a tag containing said one or more cells; and (d) using said determined translation to sample and decode said tag data.

Optionally, said determined translation is a maximum likelihood translation.

Optionally, step (c) comprises:
aligning said tag with said target grid.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, M translation symbols in a row of M cells define a cyclic position code having minimum distance M, said code being defined by a first codeword, and wherein step (b) comprises decoding said first codeword.

Optionally, M translation symbols in a column of M cells define a cyclic position code having minimum distance M, said code being defined by a second codeword, and wherein step (b) comprises decoding said second codeword.

Optionally, each tag comprises N cells, and at least N translation symbols form a third codeword with minimum distance N, wherein N is an integer having a value of at least 4, and wherein step (b) comprises decoding said third codeword.

Optionally, said captured image contains a tag-sized portion of said coding pattern, and said tag-sized portion contains at least N translation symbols.

Optionally, each cell comprises at least one orientation symbol encoded by at least one data element, such that any tag-sized portion of said coding pattern is guaranteed to contain a plurality of said orientation symbols, each orientation symbol identifying an orientation of a layout of said tag data with respect to said target grid.

Optionally, said data elements are macrodots.

Optionally, a portion of data is represented by a macrodot occupying one of a plurality of possible positions within a cell, each position representing one of a plurality of possible data values.

Optionally, each cell defines a symbol group, each symbol group comprising a plurality of Reed-Solomon symbols encoded by a plurality of said data elements.

Optionally, each symbol comprises two halves, each half comprising 2 bits of data represented by a macrodot occupying one of 4 possible positions within said half.

Optionally, said method comprises the further step of:
using said determined translation to sample and decode said Reed-Solomon symbols.

In a further aspect there is provided a system for imaging a coding pattern disposed on a surface of a substrate, said system comprising:

(A) said substrate, wherein said coding pattern comprises:
a plurality of target elements defining a target grid, said target grid comprising a plurality of cells, wherein neighboring cells share target elements;
a plurality of data elements contained in each cell; and
a plurality of tags, each tag being defined by a plurality of contiguous cells, each tag comprising respective tag data encoded by a respective set of said data elements, wherein each cell comprises one or more translation symbols encoded by a respective set of said data elements, said one or more translation symbols identifying a translation of said cell relative to a tag containing said cell;

(B) an optical reader comprising:
an image sensor for capturing an image of a portion of said coding pattern, said image sensor having a field-of-view of at least one tag diameter and less than two tag diameters; and
a processor configured for performing the steps of:
(i) sampling and decoding one or more translation symbols;
(ii) determining a translation of one or more cells relative to a tag containing said one or more cells; and
(iii) using said determined translation to sample and decode said tag data.

Optionally, each cell comprises a pair of orthogonal translation symbols, each orthogonal translation symbol identifying a respective orthogonal translation of said cell relative to a tag containing said cell.

Optionally, each tag is square and comprises $M^2$ contiguous square cells, wherein M is an integer having a value of at least 2.

Optionally, each tag comprises N cells, and at least N translation symbols form a third codeword with minimum distance N, wherein N is an integer having a value of at least 4.

Optionally, said reader is an optically imaging pen having a nib.

BRIEF DESCRIPTION OF DRAWINGS

Preferred and other embodiments of the invention will now be described, by way of non-limiting example only, with reference to the accompanying drawings, in which:

FIG. 22A is a bottom and nib end partial perspective of the pen;

FIG. 22B is a bottom and nib end partial perspective with the fields of illumination and field of view of the sensor window shown in dotted outline;

FIG. 24A is a partial longitudinal cross section of the nib and barrel molding;

FIG. 24B is a partial longitudinal cross section of the IR LED's and the barrel molding;

DETAILED DESCRIPTION OF PREFERRED AND OTHER EMBODIMENTS

1.1 Netpage System Architecture

Figure 1:
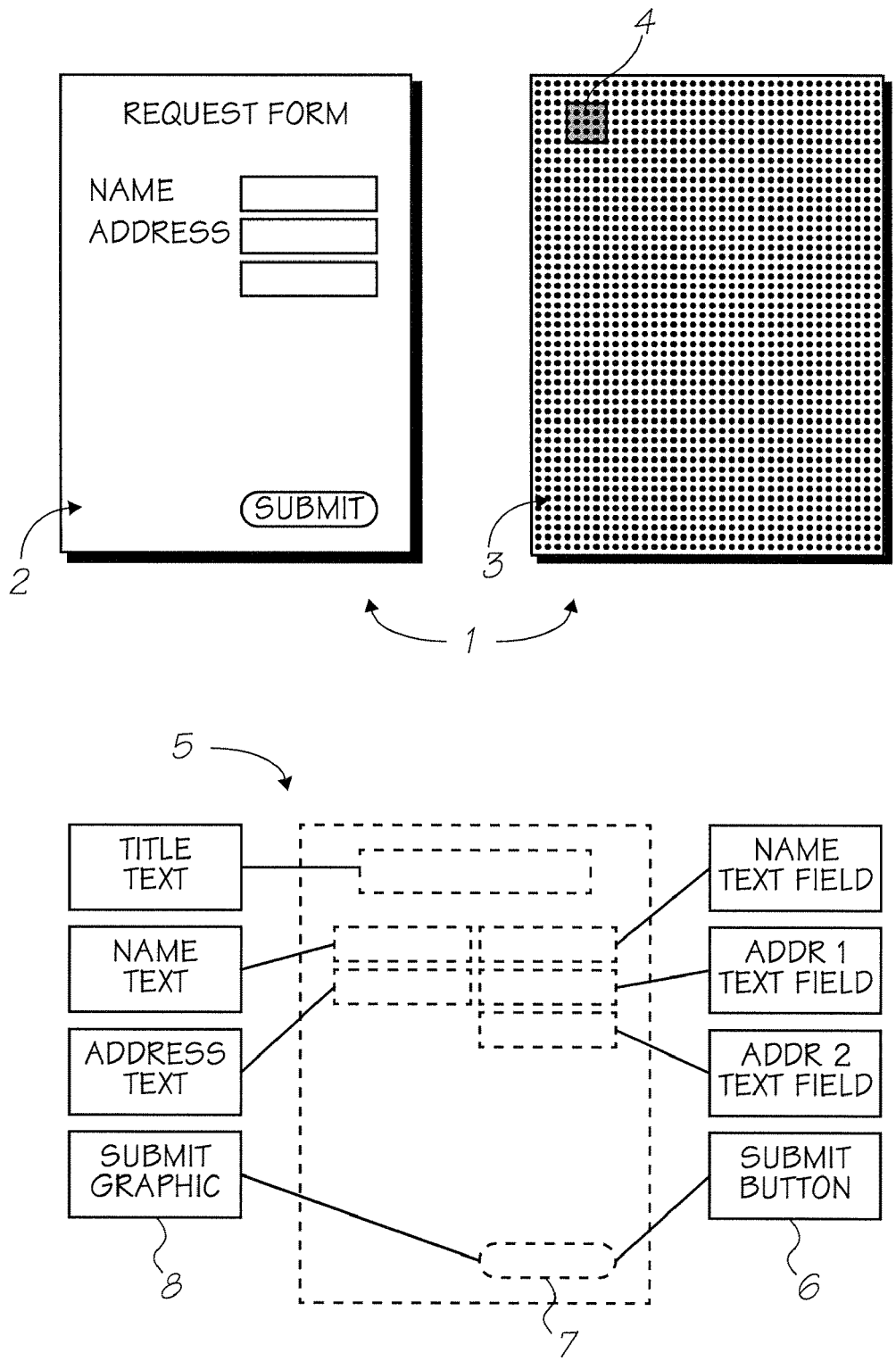
FIG. 1 is a schematic of a the relationship between a sample printed netpage and its online page description.

In a preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). References herein to "pen" or "netpage pen" are provided by way of example only. It will, of course, be appreciated that the pen may take the form of any of the sensing devices described above.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

As illustrated in FIG. 1, a printed netpage 1 can represent an interactive form which can be filled in by the user both physically, on the printed page, and "electronically", via communication between the pen and the netpage system. The example shows a "Request" form containing name and address fields and a submit button. The netpage 1 consists of graphic data 2, printed using visible ink, and a surface coding pattern 3 superimposed with the graphic data. The surface coding pattern 3 comprises a collection of tags 4. One such tag 4 is shown in the shaded region of FIG. 1, although it will be appreciated that contiguous tags 4, defined by the coding pattern 3, are densely tiled over the whole netpage 1.

The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
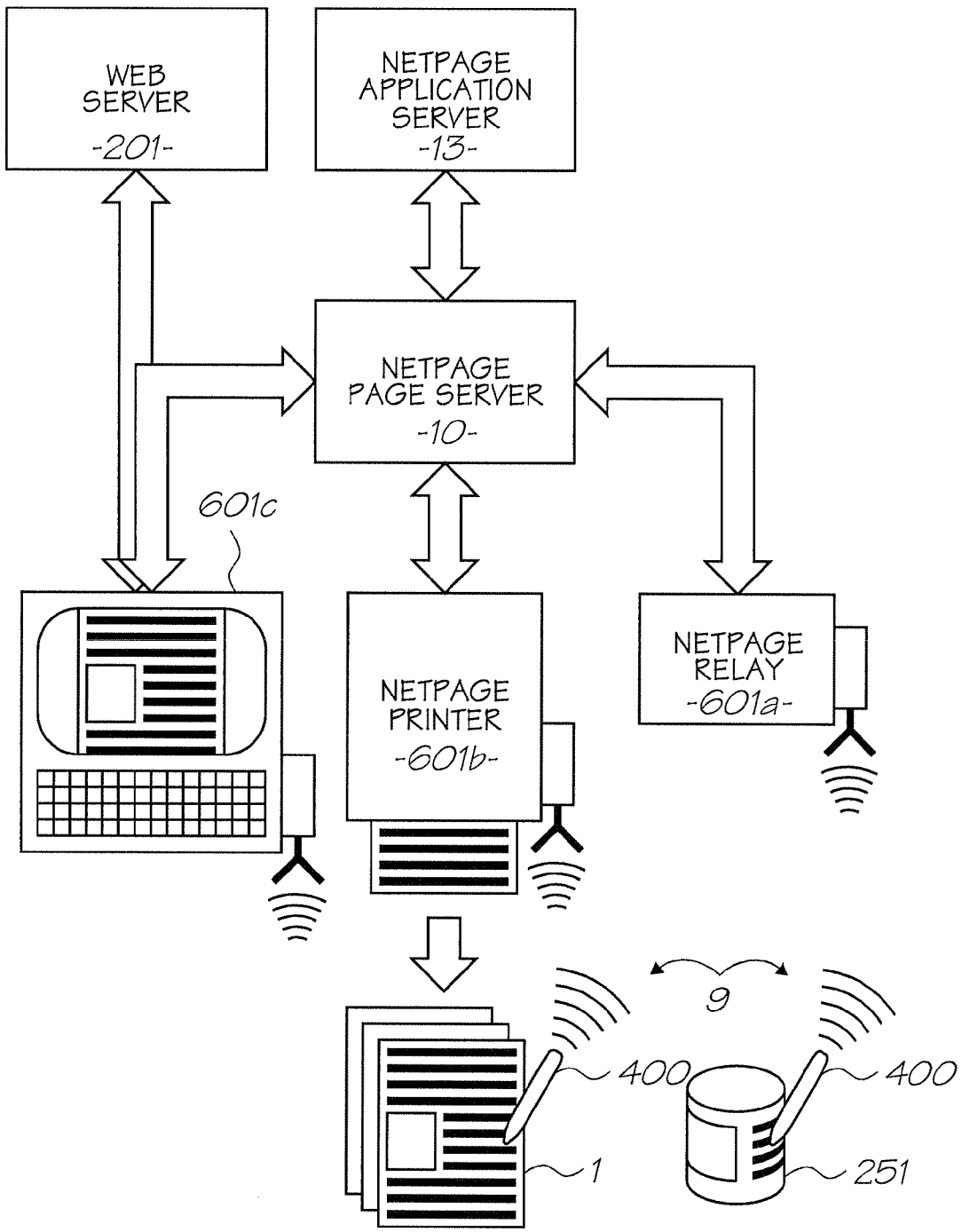
FIG. 2 shows an embodiment of basic netpage architecture with various alternatives for the relay device.

As illustrated in FIG. 2, a netpage sensing device 400, such as the pen described in Section 3, works in conjunction with a netpage relay device 601, which is an Internet-connected device for home, office or mobile use. The pen 400 is wireless and communicates securely with the netpage relay device 601 via a short-range radio link 9. In an alternative embodiment, the netpage pen 400 utilises a wired connection, such as a USB or other serial connection, to the relay device 601.

The relay device 601 performs the basic function of relaying interaction data to a page server 10, which interprets the interaction data. As shown in FIG. 2, the relay device 601 may, for example, take the form of a personal computer 601a, a netpage printer 601b or some other relay 601c (e.g. personal computer or mobile phone incorporating a web browser).

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 2, the netpage sensing device 400 interacts with a portion of the tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the sensing device 400 may be relayed directly to the page server 10 as interaction data. Alternatively, the interaction data may be encoded in the form of an interaction URI and transmitted to the page server 10 via a user's web browser 601*c*. The web browser 601*c* may then receive a URI from the page server 10 and access a webpage via a webserver 201. In some circumstances, the page server 10 may access application computer software running on a netpage application server 13.

The netpage relay device 601 can be configured to support any number of sensing devices, and a sensing device can work with any number of netpage relays. In the preferred implementation, each netpage sensing device 400 has a unique identifier. This allows each user to maintain a distinct profile with respect to a netpage page server 10 or application server 13.

Digital, on-demand delivery of netpages 1 may be performed by the netpage printer 601*b*, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

1.2 Netpages

Netpages are the foundation on which a netpage network is built. They provide a paper-based user interface to published information and interactive services.

As shown in FIG. 1, a netpage consists of a printed page (or other surface region) invisibly tagged with references to an online description 5 of the page. The online page description 5 is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device 601. The pen 400 is wireless and communicates with the netpage relay device 601 via a short-range radio link. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

2 Netpage Tags

2.1 Tag Data Content

Each tag 4 identifies an absolute location of that tag within a region of a substrate.

Each interaction with a netpage should also provide a region identity together with the tag location. In a preferred embodiment, the region to which a tag refers coincides with an entire page, and the region ID is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

As described in the Applicant's previous applications (e.g. U.S. Pat. No. 6,832,717), the region identity may be encoded discretely in each tag 4. As will be described in more detail below, the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Orientation data read from a tag enables the rotation (yaw) of the pen 400 relative to the substrate to be determined A tag 4 may also encode one or more flags which relate to the region as a whole or to an individual tag. One or more flag bits may, for example, signal a sensing device to provide feedback indicative of a function associated with the immediate area of the tag, without the sensing device having to refer to a description of the region. A netpage pen may, for example, illuminate an "active area" LED when in the zone of a hyperlink.

A tag 4 may also encode a digital signature or a fragment thereof. Tags encoding (partial) digital signatures are useful in applications where it is required to verify a product's authenticity. Such applications are described in, for example, US Publication No. 2007/0108285, the contents of which is herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size, MIME data etc) may also be encoded into each tag or a plurality of tags, as will be explained in more detail below.

2.2 General Tag Structure

Figure 3:
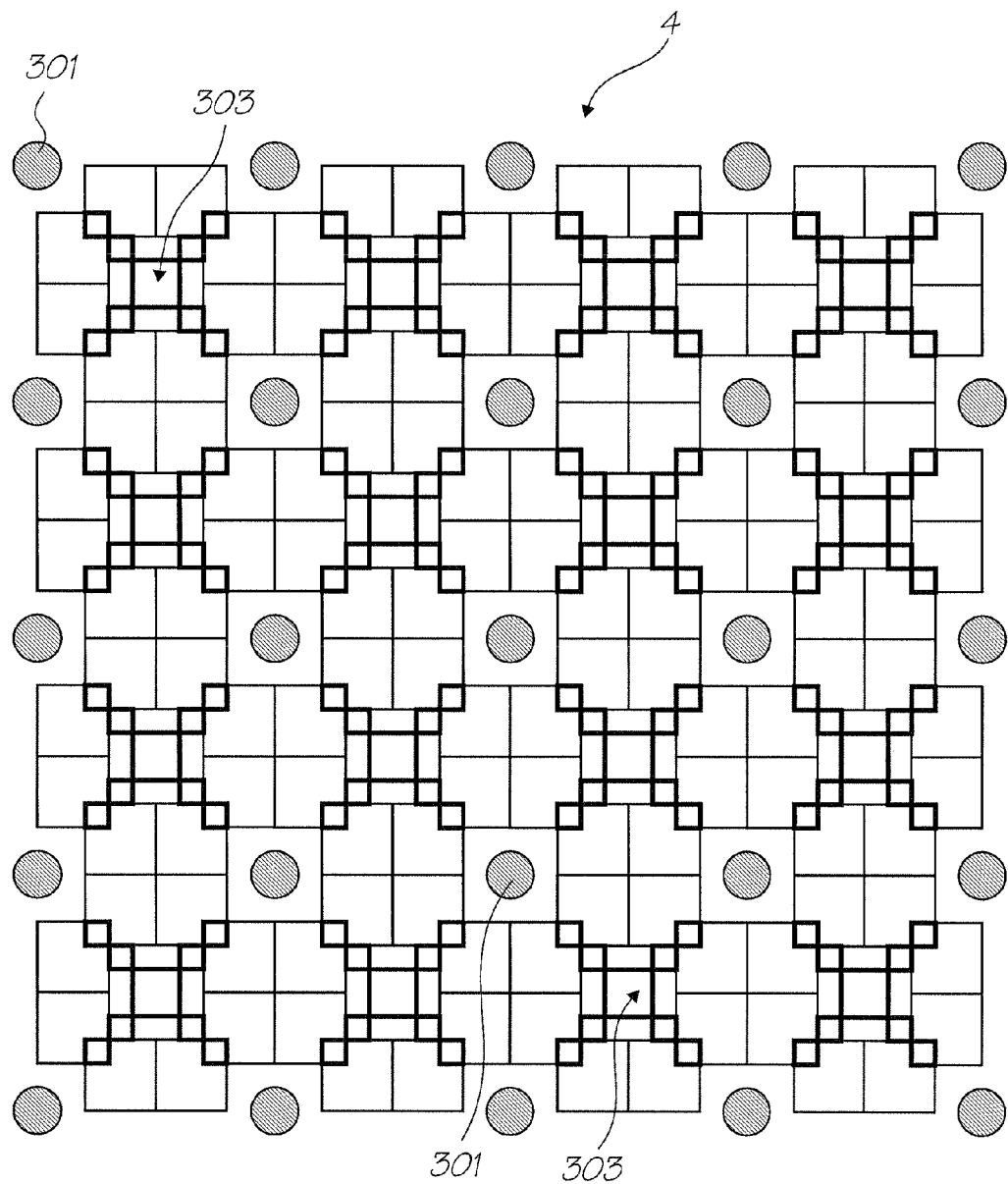
FIG. 3 shows the structure of a tag.
Figure 4:
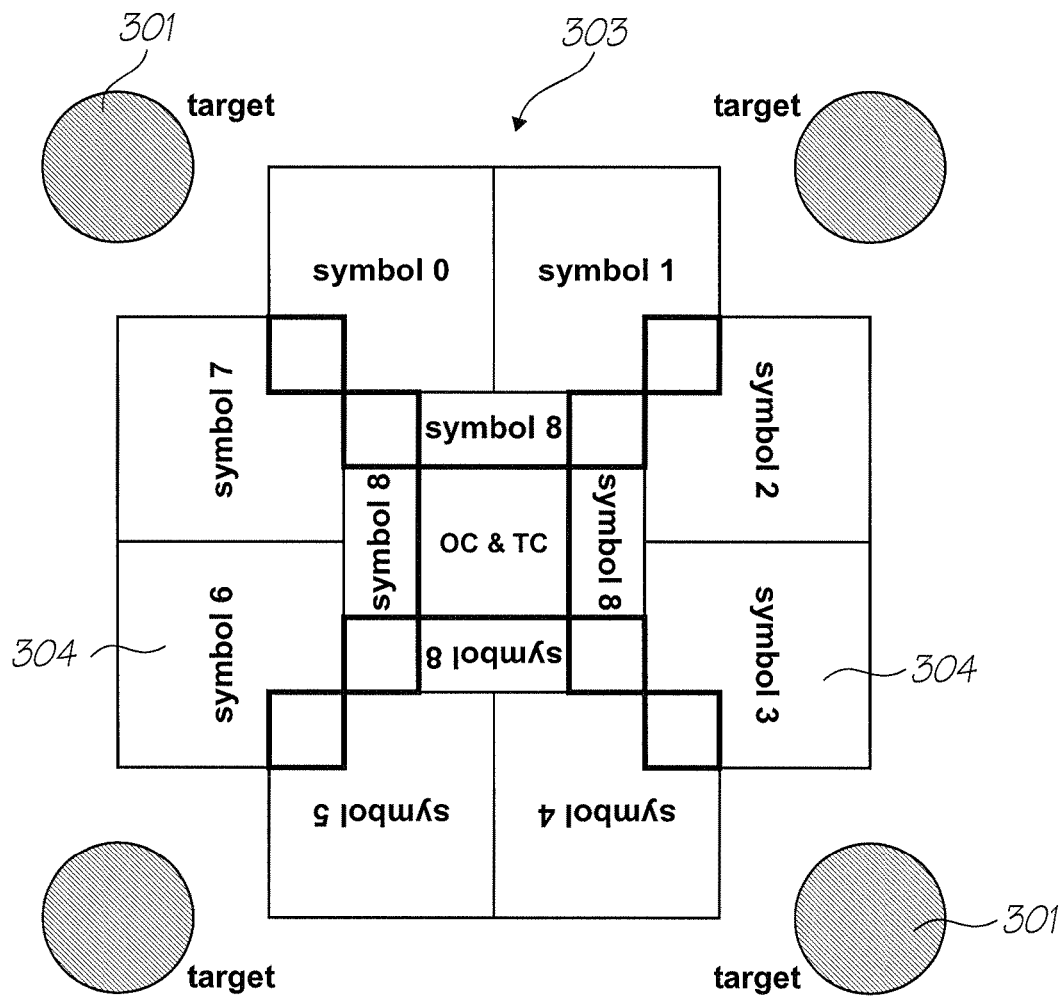
FIG. 4 shows a group of nine symbols and four targets.

As described above in connection with FIG. 1, the netpage surface coding generally consists of a dense planar tiling of tags. In the present invention, each tag 4 is represented by a coding pattern which contains two kinds of elements. Referring to FIGS. 3 and 4, the first kind of element is a target element. Target elements in the form of target dots 301 allow a tag 4 to be located in an image of a coded surface, and allow the perspective distortion of the tag to be inferred. The second kind of element is a data element in the form of a macrodot 302 (see FIG. 8). Each macrodot 302 encodes a data value. As described in the Applicant's earlier disclosures (e.g. U.S. Pat. No. 6,832,717), the presence or absence of a macrodot was be used to represent a binary bit. However, the tag structure of the present invention encodes a data value using pulse position modulation, which is described in more detail in Section 2.3.

The coding pattern 3 is represented on the surface in such a way as to allow it to be acquired by an optical imaging system, and in particular by an optical system with a narrowband response in the near-infrared. The pattern 3 is typically printed onto the surface using a narrowband near-infrared ink.

FIG. 3 shows the structure of a complete tag 4 with target elements 301 shown. The tag 4 is square and contains twenty-five target elements. Those target elements 301 located at the edges and corners of the tag (sixteen in total) are shared by adjacent tags and define the perimeter of the tag. In contrast with the Applicant's previous tag designs, the high number of target elements 301 advantageously facilitates accurate determination of a perspective distortion of the tag 4 when it is imaged by the sensing device 400. This improves the accuracy of tag sensing and, ultimately, position determination.

The tag 4 consists of a square array of sixteen symbol groups 303. Symbol groups 303 are demarcated by the target elements 301 so that each symbol group is contained within a square defined by four target elements. Adjacent symbol groups 303 are contiguous and share targets.

Since the target elements 301 are all identical, they do not demarcate one tag from its adjacent tags. Viewed purely at the level of target elements, only symbol groups 303, which define cells of a target grid, can be distinguished—the tags 4 themselves are indistinguishable by viewing only the target elements. Hence, tags 4 must be aligned with the target grid as part of tag decoding.

2.3 Symbol Groups

As shown in FIG. 4, each of the sixteen symbol groups 303 comprises nine data symbols 304, each data symbol being part of a codeword. In addition, each symbol group 303 comprises an orientation code ('OC') and one symbol from each of two orthogonal translation codes ('TC'). The orientation code allows the orientation of the tag in the field of view to be determined. The two orthogonal translation codes allow the translation of tag(s) relative to the symbol groups 303 in the field of view to be determined. In other words, the translation codes enable alignment of the 'invisible' tags with the target grid.

Each symbol 304 contains four bits of data. Generally, each symbol 304 is divided into two halves, and each of these two halves $\{h_0, h_1\}$ is encoded using two-bit pulse position modulation, i.e. using a single macrodot 302 in one of four positions $\{p_{00}, p_{01}, p_{10}, p_{11}\}$ in the half. The half $h_0$ encodes the least-significant bits of the symbol; the half $h_1$ encodes the most-significant bits.

Figure 5:
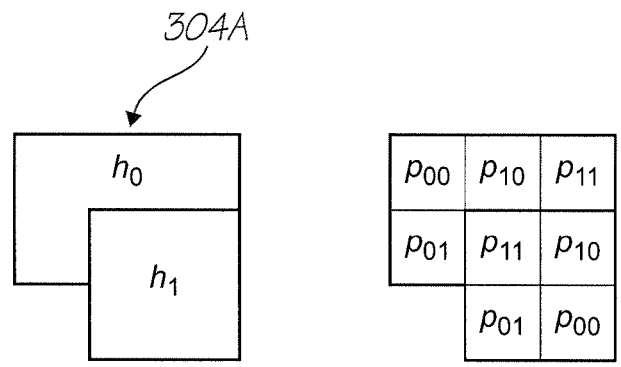
FIG. 5 shows a left-handed symbol unit cell.
Figure 6:
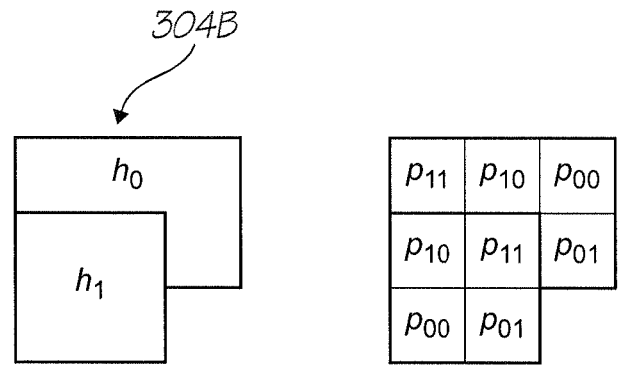
FIG. 6 shows a right-handed symbol unit cell.
Figure 7:
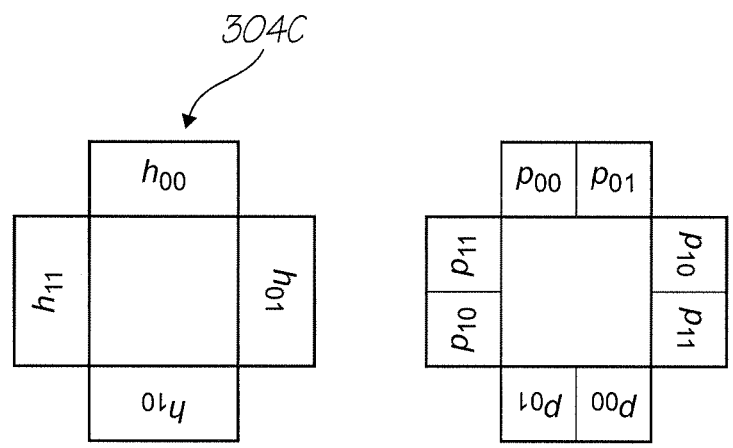
FIG. 7 shows a centered symbol unit cell.

The layout of a left-handed symbol unit cell 304A, i.e. as used by symbols 0, 2, 4 and 6, is shown in FIG. 5. The layout of a right-handed symbol unit cell 304B, i.e. as used by symbols 1, 3, 5 and 7, is shown in FIG. 6. The layout of the centered symbol unit cell, i.e. as used by symbol 8, is shown in FIG. 7.

Figure 8:
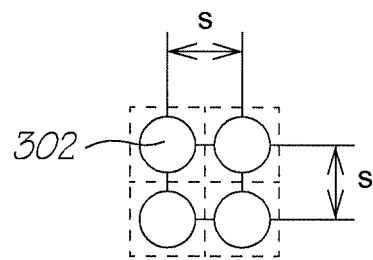
FIG. 8 shows the spacing of macrodot positions.

The spacing of macrodots 302 in both dimensions, as shown in FIG. 8, is specified by the parameter s. It has a nominal value of 95 µm, based on 6 dots printed at a pitch of 1600 dots per inch.

Figure 9:
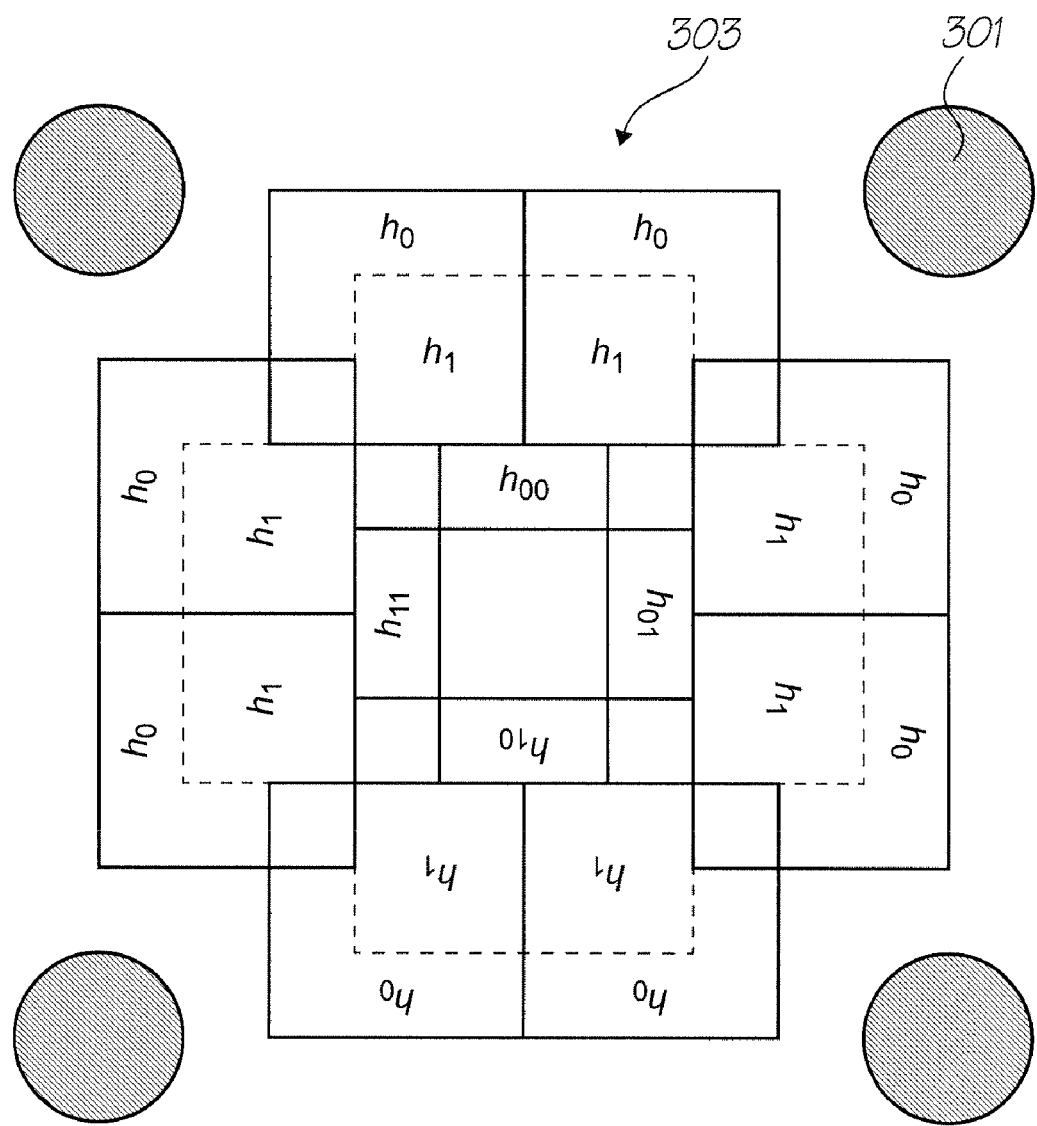
FIG. 9 shows the layout of symbols within a symbol group.

As shown in FIG. 9, the left-handed and right-handed symbol layouts are repeated four times at four orientations within a symbol group 303, and the centered symbol layout appears once in the center of the symbol group.

Figure 10:
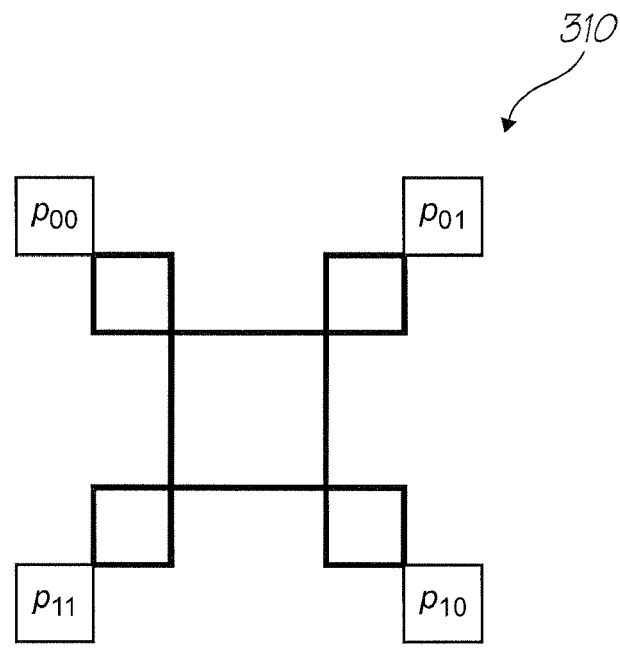
FIG. 10 shows an orientation code symbol layout.

The orientation code consists of a single symbol which contains two bits of data, and is encoded using pulse position modulation. FIG. 10 shows the layout of an orientation code symbol 310.

Figure 11:
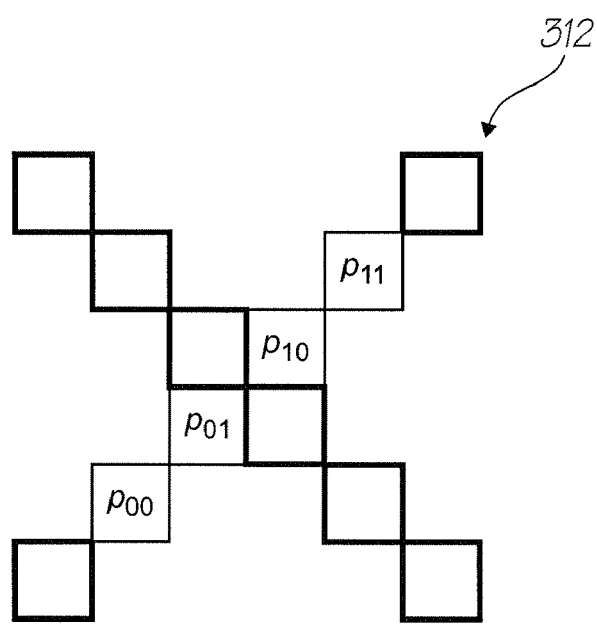
FIG. 11 shows a translation code symbol layout.

Each translation code symbol contains two bits of data, and is encoded using pulse position modulation. FIG. 11 shows the layout of one of the translation code symbols 312.

Figure 12:
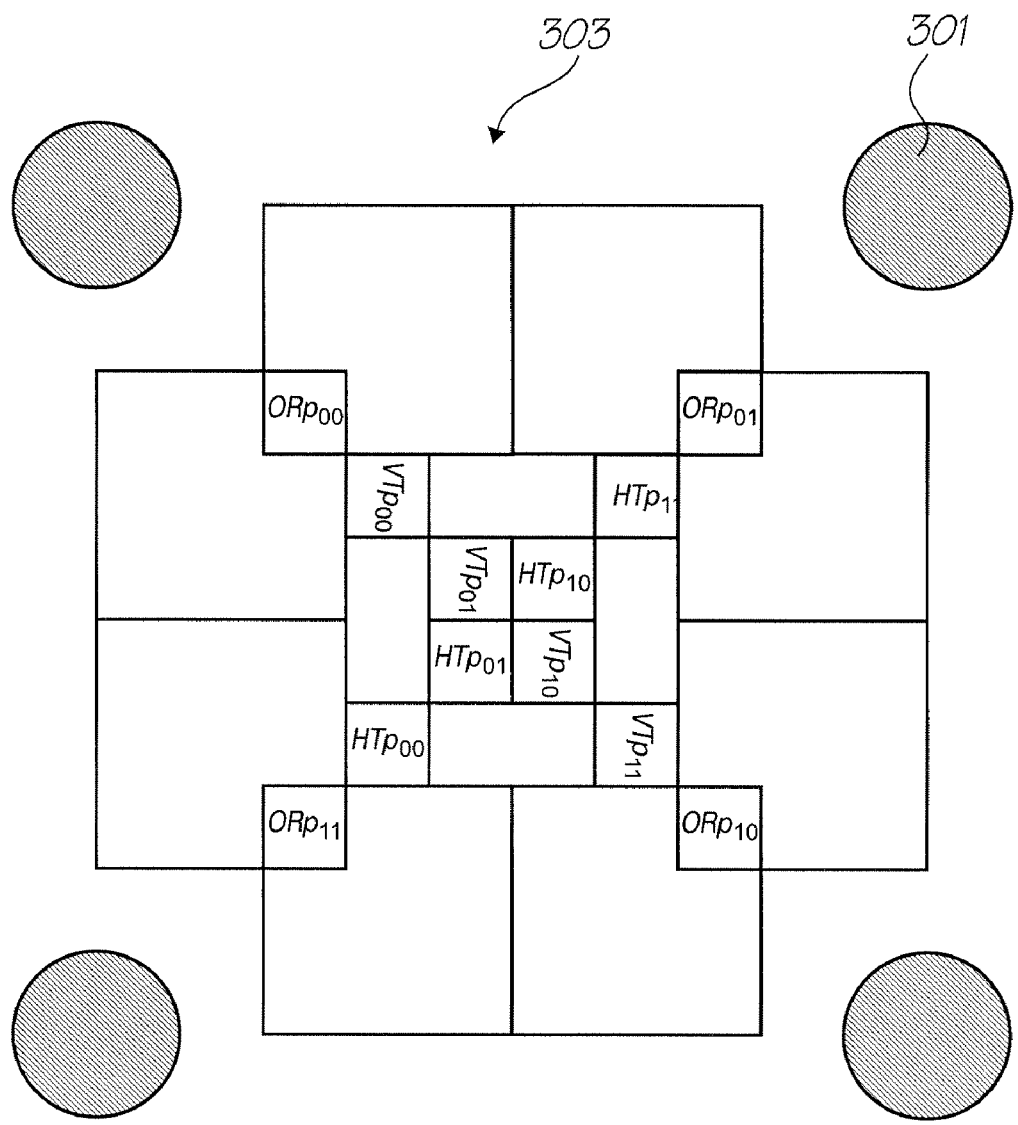
FIG. 12 shows the layout of orientation and translation code symbols within a symbol group.

As shown in FIG. 12, the translation code symbol layout appears twice at two orientations within a symbol group to indicate the horizontal and vertical translation of the symbol group relative to the tag (via the HT and VT symbols respectively). The orientation code symbol layout appears once to indicate the orientation of the tag (via the OR symbol).

2.4 Targets and Macrodots

Only macrodots 302 are part of the representation of a symbol 304 in the pattern. The outline of a symbol 304 is shown in, for example, FIGS. 3, 4 and 12 merely to elucidate more clearly the structure of a tag.

A macrodot 302 is nominally circular with a nominal diameter of (4/6)s. However, it is allowed to vary in size by ±15% according to the capabilities of the device used to produce the pattern.

A target 301 is nominally circular with a nominal diameter of (12/6)s. However, it is allowed to vary in size by ±15% according to the capabilities of the device used to produce the pattern.

Each tag 4 has a width of 40 s and a length of 40 s.

The macrodot spacing, and therefore the overall scale of the tag pattern, is allowed to vary by ±11% according to the capabilities of the device used to produce the pattern. Any deviation from the nominal scale is recorded in each tag (in a tag size ID field) to allow accurate generation of position samples.

These tolerances are independent of one another. They may be refined with reference to particular printer characteristics.

2.5 Encoded Codes and Codewords

In the following section, each symbol in FIGS. 13 to 16 is shown with a unique label. The label consists of an alphabetic prefix which identifies which codeword the symbol is part of, and a numeric suffix which indicates the index of the symbol within the codeword. For simplicity only data symbols 304 are shown, not orientation and translation code symbols, and the centered data symbol is shown as a centered square rather than as four fragments (as shown in FIGS. 4 and 7).

Although some symbol labels are shown rotated to indicate the symmetry of the layout of certain codewords, the layout of each symbol is determined by its position within a symbol group, as indicated in FIG. 9, and not by the rotation of the symbol label (as described in, for example, the Applicant's US Publication No. 2006/146069).

2.5.1 Orientation Code

Each symbol group encodes a one-symbol 4-ary orientation code. The code is defined by the set of codewords $\{\{0\}, \{1\}, \{2\}, \{3\}\}$. These codewords correspond to clockwise tag rotations of 0, 90, 180 and 270 degrees respectively. Each codeword corresponds to its predecessor read at an orientation of 90 degrees, hence a single codeword gives rise to the entire code when rotated. The code has a minimum distance of 1. The codes of an entire tag form a code with a minimum distance of 16, allowing 7 symbol errors to be corrected. If additional symbols are visible within the field of view then they can be used for even more robust decoding. A minimum of three orientation codes, with a combined minimum distance of 3, must be decoded to allow a single symbol error to be corrected.

2.5.2 Translation Code

Each row of symbol groups and each column of symbol groups encodes a four-symbol 4-ary cyclic position code (The Applicant's cyclic position codes are described in U.S. Pat. No. 7,082,562, the contents of which is herein incorporated by reference). The code is defined by the codeword {0, 1, 2, 3} It has a minimum distance of 4, allowing a single symbol error to be corrected. The codes of an entire tag form a code with a minimum distance of 16, allowing 7 symbol errors to be corrected. If additional symbols are visible within the field of view then they can be used for even more robust decoding.

The top left corner of an un-rotated tag is identified by a symbol group which encodes the first symbol in two orthogonal cyclic position codewords.

2.5.3 Local Codeword

The tag locally contains one complete data codeword which is used to encode information unique to the tag, which is typically the x- and y-coordinates of the tag. The codeword is of a $2^4$-ary (15,7) Reed-Solomon code. The tag therefore encodes up to 28 bits of information unique to the tag.

The local codeword is replicated four times within the tag. This ensures that an image of the tag pattern large enough to contain only one complete tag is guaranteed to contain a complete copy of the local codeword, irrespective of the alignment of the image with the tag pattern. Hence, unlike the tag patterns described in, for example, U.S. Pat. No. 6,832,717, a field of view spanning at least two whole tags is not required to capture location data. This advantageously places fewer demands on the image sensor, most notably the requirement for fewer image pixels or, alternatively, more accurate capturing of images using a smaller field of view.

Figure 13:
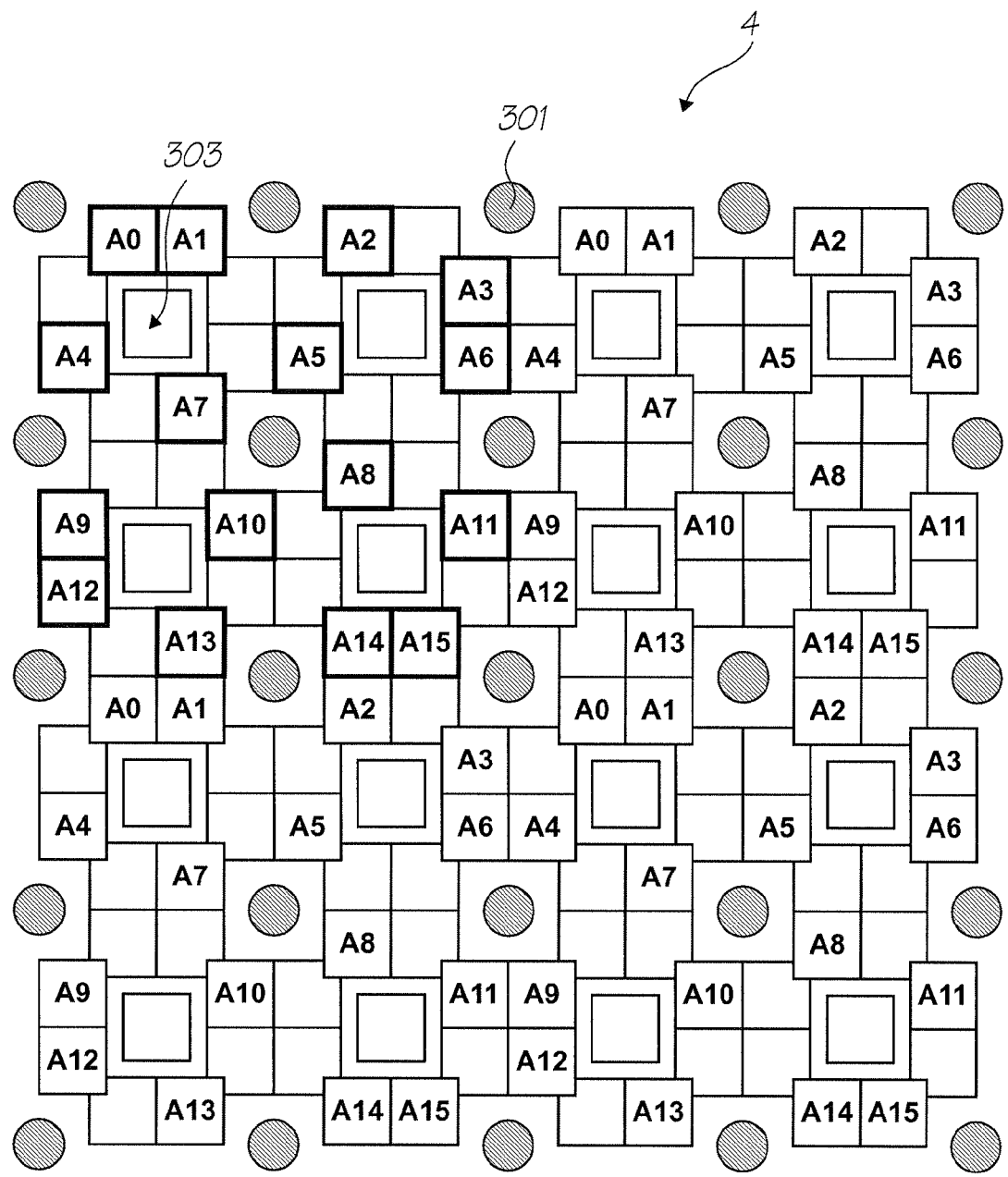
FIG. 13 shows a replicated local codeword A with the first copy shown shaded.

The layout of the local codeword is shown in FIG. 13.

2.5.4 Common Codewords

The tag 4 also contains four data codewords which encode information common to a set of contiguous tags, which is typically the region identity. Each codeword is of a $2^4$-ary (15,11) Reed-Solomon code. The tag therefore encodes up to 176 bits of information common to a set of contiguous tags.

The common codewords are replicated throughout the tag pattern in such a way that an image of the tag pattern large enough to contain a complete tag (i.e. an image having a diameter of about one tag diagonal) is guaranteed to contain a complete copy of each common codeword, irrespective of the alignment of the image with the tag pattern. The complete copy of each common codeword may consist of fragments which lie in different tags.

Figure 14:
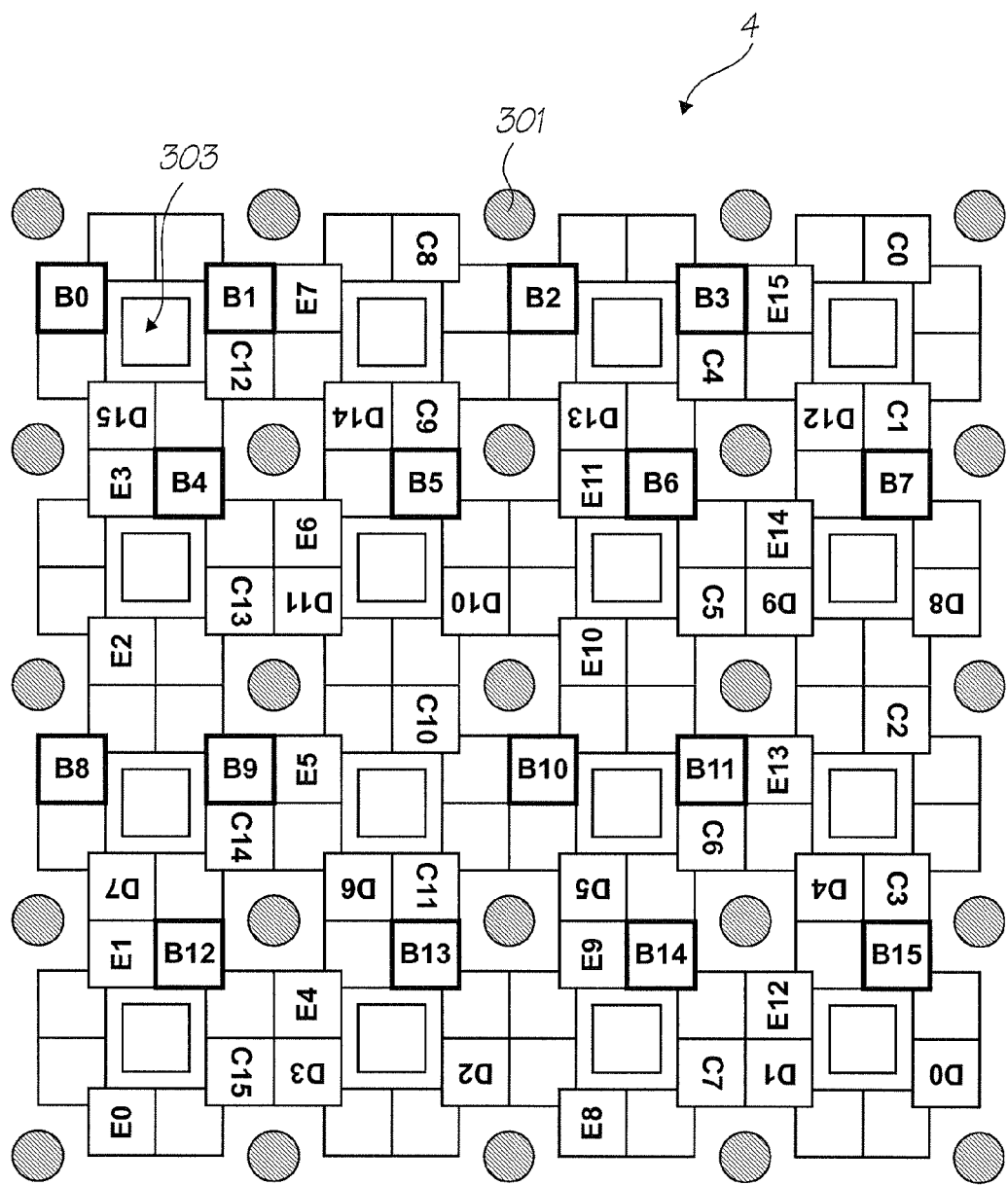
FIG. 14 shows common codewords B, C, D and E with codeword B shown shaded.

The layout of the four common codewords is shown in FIG. 14. (As noted earlier, even though some symbol labels are shown rotated in FIG. 14 to indicate symmetry, the layout of a particular symbol is determined by its position within a symbol group).

2.5.5 Data Stream Fragment Codewords

The tag 4 optionally contains a codeword which encodes a fragment of a larger data stream embedded in the surface coding. Each codeword is of a $2^4$-ary (15,11) Reed-Solomon code. The tag therefore optionally encodes 44 bits of the data stream. The embedded data stream is discussed further in Section 2.8.3.

Figure 15:
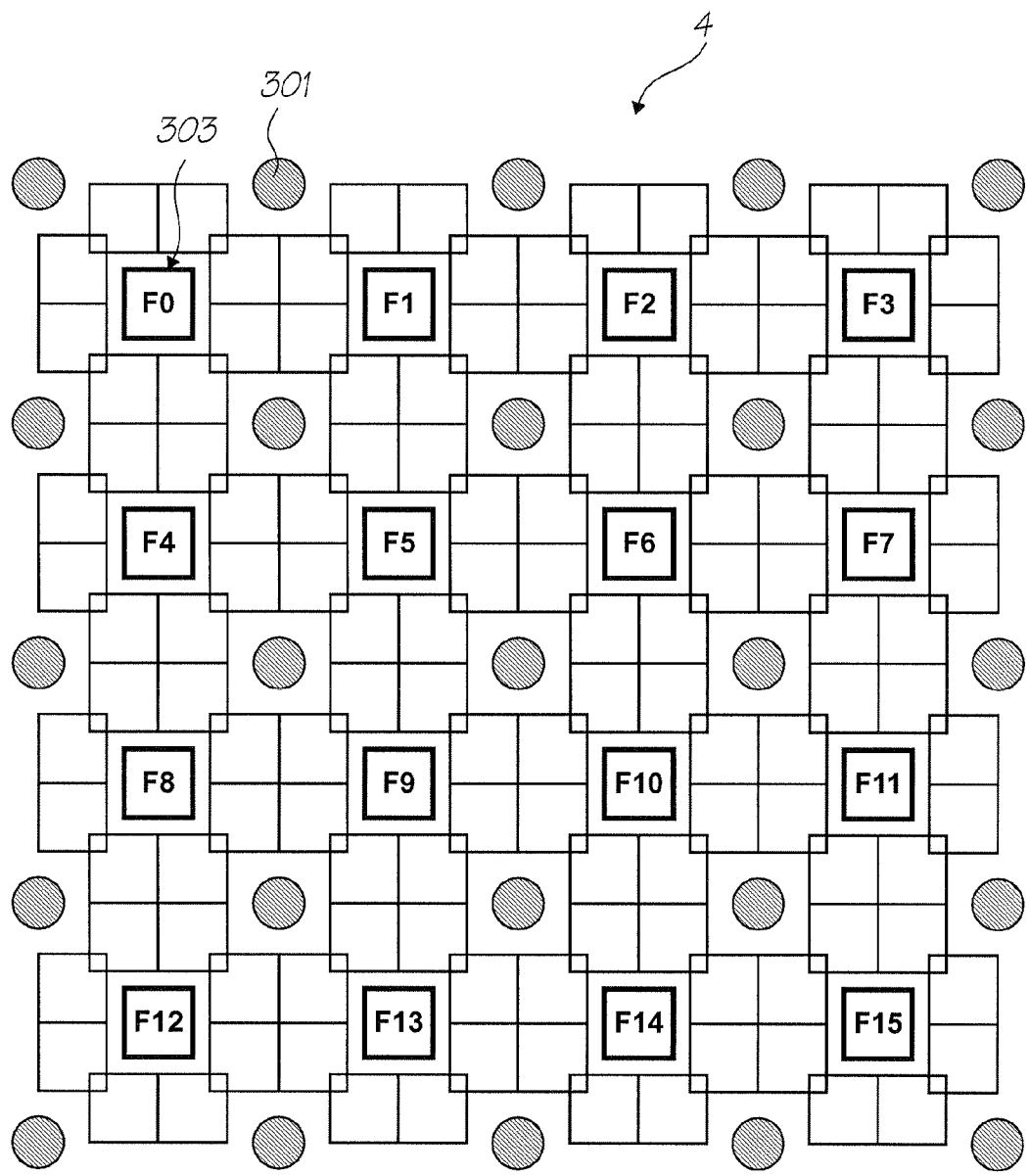
FIG. 15 shows a data stream fragment codeword F.

The layout of the data stream fragment codeword is shown in FIG. 15.

2.5.6 Complete Tag

Figures 16, 17:
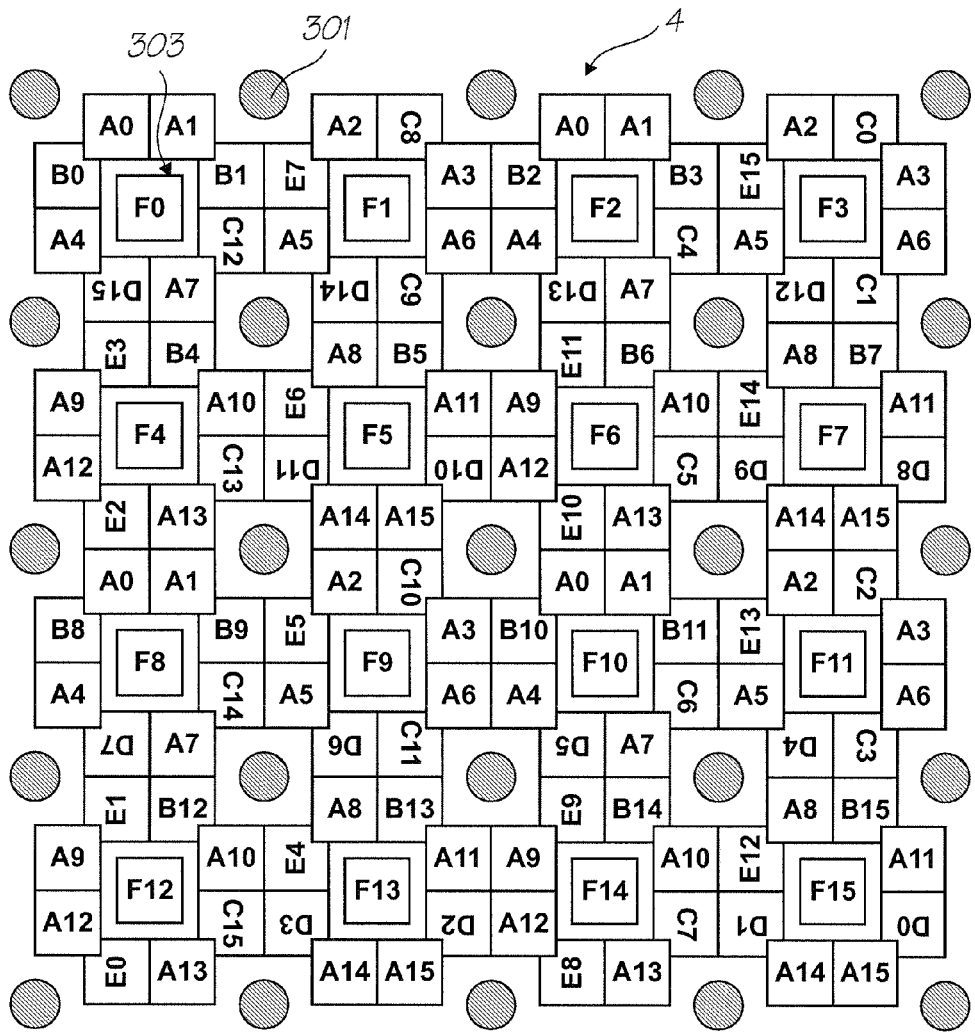
FIG. 16 shows the layout of a complete tag.
FIG. 17 shows a local codeword layout.

FIG. 16 shows the layout of the data of a complete tag, with each symbol group comprising nine data symbols. The orientation and translation codes are not shown in FIG. 16.

2.6 Reed-Solomon Encoding

2.6.1 Local Codeword

The local codeword is encoded using a $2^4$-ary (15,7) Reed-Solomon code. The code encodes 28 data bits (i.e. seven symbols) and 32 redundancy bits (i.e. eight symbols) in each codeword. Its error-detecting capacity is eight symbols. Its error-correcting capacity is four symbols.

As shown in FIG. 17, redundancy coordinates $r_i$ and data coordinates $d_i$ of the code are indexed from left to right according to the power of their corresponding polynomial terms. The symbols $A_i$ of a complete codeword are indexed from right to left to match the bit order of the data. The bit order within each symbol is the same as the overall bit order.

The code has the following primitive polynominal:

$$p(x)=x^4+x+1$$

The code has the following generator polynominal:

$$g(x)=(x+\alpha)(x+\alpha^2)(x+\alpha^3)\ldots(x+\alpha^8)$$

The layout of the local codeword in the tag includes a spare symbol, so it would be possible to extend or augment the code to use this extra symbol.

2.6.2 Common and Data Stream Fragment Codewords

The common and data stream fragment codewords are encoded using a $2^4$-ary (15,11) Reed-Solomon code. The code encodes 44 data bits (i.e. eleven symbols) and 16 redundancy bits (i.e. four symbols) in each codeword. Its error-detecting capacity is four symbols. Its error-correcting capacity is two symbols.

The redundancy coordinates and data coordinates of the code are indexed from left to right according to the power of their corresponding polynomial terms. The symbols of a complete codeword are indexed from right to left to match the bit order of the data. The bit order within each symbol is the same as the overall bit order.

The code has the same primitive polynominal as the local codeword code.

The code has the following generator polynominal:

$$g(x)=(x+\alpha)(x+\alpha^2)(x+\alpha^3)(x+\alpha^4)$$

For a detailed description of Reed-Solomon codes, reference is made to Wicker and Bhargava, *Reed-Solomon Codes and Their Applications*, IEEE Press, 1994, the contents of which is herein incorporated by reference.

The layout of each common and data stream fragment codeword in the tag includes a spare symbol, so it would be possible to extend or augment the code to use this extra symbol.

2.7 Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the tag position is taken to be the position of the top left target in each tag.

2.8 Tag Information Content
2.8.1 Field Definitions

Table 1 defines the information fields embedded in the surface coding.

TABLE 1

| field | width (bits) | description |
|---|---|---|
| unique to tag | | |
| active area flag | 1 | A flag indicating whether the area[a] immediately surrounding a tag intersects an active area. b'1' indicates intersection. |
| x coordinate | 13 | The unsigned x coordinate of the tag[b]. |
| y coordinate | 13 | The unsigned y coordinate of the tag[b]. |
| common to tagged region | | |
| encoding format | 8 | The format of the encoding. 0: the present encoding. Other values are reserved |
| region flags | 8 | Flags controlling the interpretation of region data (see Table 2). |
| tag size ID | 8 | The ID of the tag size. |
| region ID | 96 | The ID of the region containing the tags. |
| high-order coordinate width (w) | 4 | The width of the high-order part of the x and y coordinates of the tag |
| high-order x coordinate | $w^c$ | High-order part of the x coordinate of the tag[d]. |
| high-order y coordinate | $w^c$ | High-order part of the y coordinate of the tag[d]. |
| signature | $36 - 2w^c$ | A signature of the region. |
| CRC (Cyclic Redundancy Check) | 16 | A CRC[e] of common tag data. |

[a] the diameter of the area, centered on the tag, is nominally 2.5 times the diagonal size of the tag; this is to accommodate the worst-case distance between the nib position and the imaged tag
[b] allows a maximum coordinate value of 31 m for the nominal tag size of 3.81 mm (based on 1600 dpi, 6 dots per macrodot, and 40 macrodots per tag)
[c] where w is the high-order coordinate width
[d] expands the maximum coordinate value to just over 1000 km
[e] CCITT CRC-16 [see ITU, Interface between Data Terminal Equipment (DTE) and Data Circuit-terminating Equipment (DCE) for terminals operating in the packet mode and connected to public data networks by dedicated circuit, ITU-T X.25 (10/96)], computed in bit order on raw codeword data (see Table 3).

An active area is an area within which any captured input should be immediately forwarded to the corresponding Netpage server 10 for interpretation. This also allows the Netpage server 10 to signal to the user that the input has had an immediate effect. Since the server has access to precise region definitions, any active area indication in the surface coding can be imprecise so long as it is inclusive.

TABLE 2

| | Region flags |
|---|---|
| bit | meaning |
| 0 | Region ID is an EPC. Used for Hyperlabel (see, for example, U.S. Pat. No. 7,225,979). Otherwise the region ID is a Netpage region ID. |
| 1 | Region ID contains embedded data (see Section 2.8.3). Otherwise the region contains no embedded data. |
| 2 | Embedded data is a signature (see Section 2.8.4). Otherwise the data type is specified in the embedded data block (see Table 4). |
| 3 | Embedded data is a short signature (see Section 2.8.4) |
| 4 | EPC contains a layout number. Used for non-serialized Hyperlabel applications, where the serial number is replaced by a layout number (see US2007/0108285). Otherwise the EPC contains a serial number. |
| 5 | Region is non-interactive i.e. x and y coordinates are zero. Otherwise x and y coordinates are present. |
| 6-7 | Reserved for future use. Must be zero. |

The width of the high-order coordinate fields, if non-zero, reduces the width of the signature field by a corresponding number of bits. Full coordinates are computed by prepending each high-order coordinate field to its corresponding coordinate field.

2.8.2 Mapping of Fields to Codewords

Table 3 defines how the information fields map to codewords.

TABLE 3

| codeword | codeword bits | field | width | field bits |
|---|---|---|---|---|
| A | 0 | active area flag | 1 | all |
| | 1 | reserved[a] | 1 | all |
| | 14:2 | x coordinate | 13 | all |
| | 27:15 | y coordinate | 13 | all |
| B | (35 − 2w):0 | signature | 36 − 2w | all |
| | (35 − w):(36 − 2w) | high-order x coordinate | w | all |
| | 35:(36 − w) | high-order y coordinate | w | all |
| | 43:36 | region flags | 8 | 7:0 |
| C | 27:0 | region ID | 28 | 27:0 |
| | 43:28 | CRC[b] | 16 | all |
| D | 7:0 | encoding format | 8 | all |
| | 15:8 | tag size ID | 8 | all |
| | 19:16 | high-order coordinate width (w) | 4 | 3:0 |
| | 43:20 | region ID | 24 | 51:28 |
| E | 43:0 | region ID | 44 | 95:52 |

[a] must be zero
[b] the CRC is computed in bit order on the data portions of the B, C, D and E codewords, in that order, excluding the CRC field itself If the high-order coordinate width is non-zero, then special care must be taken on boundaries between tags where the low-order x or y coordinate wraps, otherwise codeword errors may be introduced. If wrapping is detected from the low-order x or y coordinate (i.e. it contains all zero bits or all one bits), then the corresponding high-order coordinate can be adjusted before codeword decoding. In the absence of genuine symbol errors in the high-order coordinate, this will prevent the inadvertent introduction of codeword errors.

2.8.3 Embedded Codewords

If the "region contains embedded data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 4, a 176-bit data block encodes 136 bits of data. The block data is encoded in the data fragments of a contiguous group of four tags arranged in a 2×2 square. A tag belongs to a block whose integer coordinate is the tag's coordinate divided by 2. Within each block the data is arranged into tags with increasing x coordinate within increasing y coordinate.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 4

Embedded data block

| field | width | description |
|---|---|---|
| data type | 8 | The type of data in the superblock. Values include: 0: type is indicated by region flags 1: MIME |
| superblock width | 8 | The width of the superblock, in blocks. |
| superblock height | 8 | The width of the superblock, in blocks. |
| data | 136 | The block data. |
| CRC | 16 | A CRC of the block data |
| total | 176 | | a. CCITT CRC-16 computed in bit order

2.8.4 Region Signatures

If the "region has signature" flag in the region flags is set then the signature field contains a signature with a maximum width of 36 bits. The signature is typically a random number associated with the region ID in a secure database. The signature is ideally generated using a truly random process, such as a quantum process ["Quantis—Quantum Random Number Generator", http://www.idquantique.com/qrng.html; "Random Numbers Generation using Quantum Physics", http://www.idquantique.com/files/whitepaperquantis.pdf, the contents of which are herein incorporated by reference], or by distilling randomness from random events [Schneier, B., "Distilling Randomness", Applied Cryptography, 2nd Edition, pp. 426-428, the contents of which is herein incorporated by reference].

In an online environment the signature can be validated, in conjunction with the region ID, by querying a server with access to the secure database.

If the "region contains embedded data" and "embedded data is a signature" flags in the region flags are set then the surface coding contains an embedded cryptographic digital signature of the region ID.

If the "embedded signature is a short signature" flag is set, then the embedded signature is a 160-bit signature encoded in a single block consisting of just the signature and a 16-bit CRC, i.e. with the superblock parameters omitted.

In an online environment any number of signature fragments can be used, in conjunction with the region ID and optionally the random signature, to validate the signature by querying a server with knowledge of the full signature or the corresponding private key.

In an offline (or online) environment the entire signature can be recovered by reading multiple tags, and can then be validated using the corresponding public signature key. The actual length and type of the signature are determined from the region ID during signature validation.

Signature verification is discussed in the Applicant's US Publication No. 2007/0108285, the contents of which are herein incorporated by reference.

2.8.5 MIME Data

If the embedded data type is "MIME" then the superblock contains Multipurpose Internet Mail Extensions (MIME) data according to RFC 2045, RFC 2046 and related RFCs (the contents of which are incorporated herein by reference). The MIME data consists of a header followed by a body. The header is encoded as a variable-length text string preceded by an 8-bit string length. The body is encoded as a variable-length type-specific octet stream preceded by a 16-bit size in big-endian format.

The basic top-level media types described in RFC 2046 include text, image, audio, video and application.

RFC 2425 and RFC 2426 (the contents of which are herein incorporated by reference) describe a text subtype for directory information suitable, for example, for encoding contact information which might appear on a business card.

2.9 Tag Imaging and Decoding

The minimum imaging field of view required to guarantee acquisition of data from an entire tag has a diameter of 56.6 s (i.e. 40√2 s), allowing for arbitrary rotation and translation of the surface coding in the field of view. Notably, the imaging field of view does not have to be large enough to guarantee capture of an entire tag—the arrangement of the data symbols within each tag ensures that any tag-sized field of view captures the requisite information in full, irrespective of whether a whole tag is actually visible.

As used herein, the term "tag-sized" is used to mean an area of the same size and dimensions as a tag. In terms of imaging the coding pattern, the imaging field-of-view is typically a circle. The imaging circle should have a diameter which is sufficiently large to contain a tag-sized portion of the coding pattern. Accordingly, the imaging field-of-view should preferably have diameter of at least one tag diameter and less than two tag diameters. Importantly, the field-of-view is not required to be at least two tag diameters, in contrast with prior art tag designs, because it is not essential in the present invention to capture an entire tag in the field of view.

Optionally, the field-of-view has a diameter of about one tag diagonal plus one or two macrodot units. The extra macrodot unit ensures that partial macrodots never have to be read at the edge of the field of view. In the present context, a "tag diameter" is given to mean the length of a tag diagonal.

Given a maximum macrodot spacing of 106 microns, this gives a required field of view of 6 mm.

Table 5 gives pitch ranges achievable for the present surface coding for different sampling rates and hence image sensor array sizes.

TABLE 5

Pitch ranges achievable for present surface coding for different image sensor sizes; dot pitch = 600 dpi, macrodot pitch = 2 dots, field of view = 4.8 mm, viewing distance = 30 mm, nib-to-FOV separation = 1 mm, sampling rate = 2

| image sensor size | pitch range | scaled[a] image sensor size |
|---|---|---|
| 150 | −30 to +39 | 187 |
| 161 | −35 to +44 | 202 |
| 176 | −40 to +48 | 220 |
| 194 | −45 to +53 | 242 |

[a] scaled by 1.25 (6 mm/4.8 mm) to accommodate maximum macrodot spacing

Figure 18:
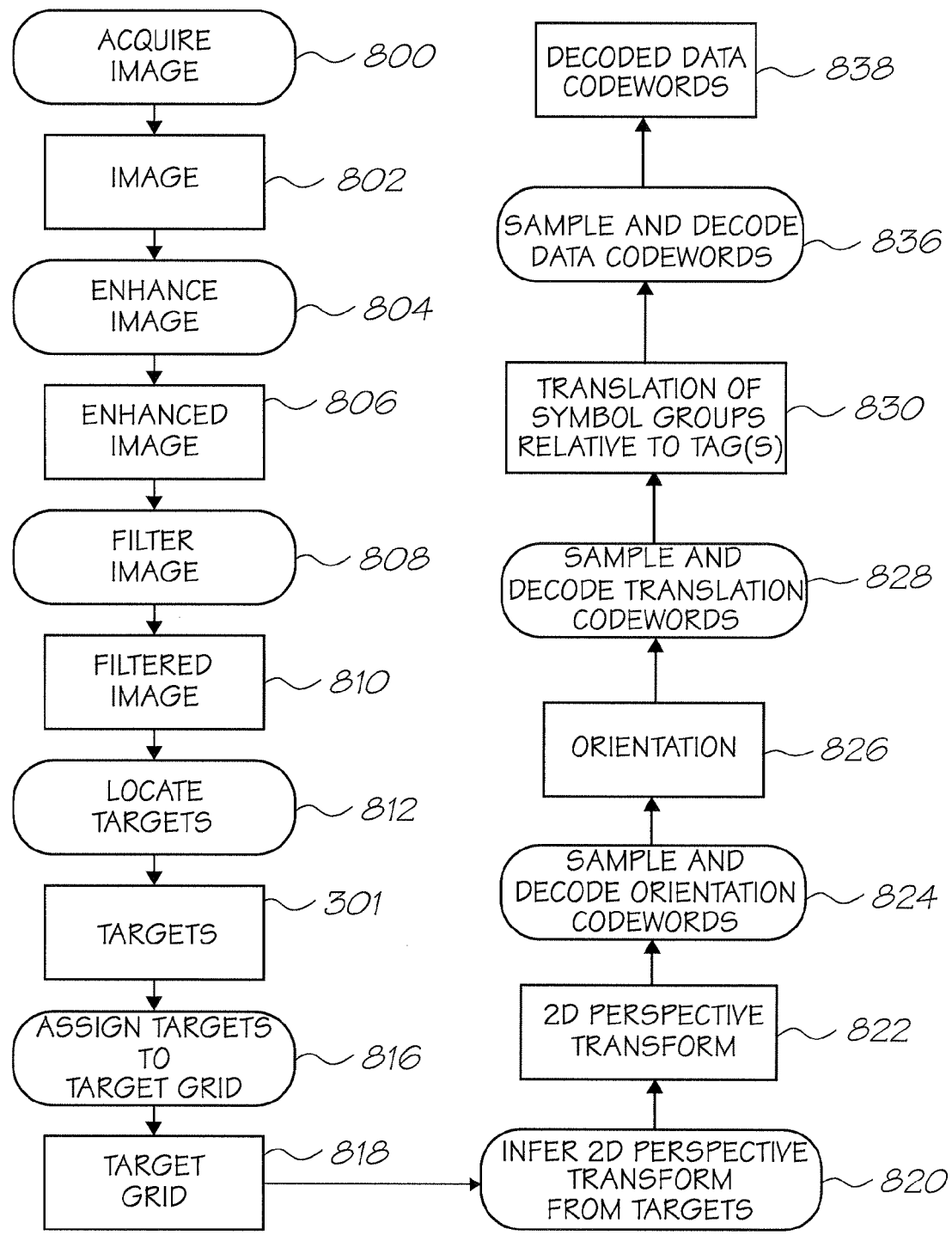
FIG. 18 is a flowchart of image processing.

FIG. 18 shows a tag image processing and decoding process flow up to the stage of sampling and decoding the data codewords. Firstly, a raw image 802 of the tag pattern is acquired (at 800), for example via an image sensor such as a CCD image sensor, CMOS image sensor, or a scanning laser and photodiode image sensor. The raw image 802 is then typically enhanced (at 804) to produce an enhanced image 806 with improved contrast and more uniform pixel intensities. Image enhancement may include global or local range expansion, equalisation, and the like. The enhanced image 806 is then typically filtered (at 808) to produce a filtered image 810. Image filtering may consist of low-pass filtering, with the low-pass filter kernel size tuned to obscure macrodots 302 but to preserve targets 301. The filtering step 808 may include additional filtering (such as edge detection) to enhance target features 301. Encoding of data codewords 304 using pulse position modulation (PPM) provides a more uniform coding pattern 3 than simple binary dot encoding (as described in, for example, U.S. Pat. No. 6,832,717). Advantageously, this helps separate targets 301 from data areas, thereby allowing more effective low-pass filtering of the PPM-encoded data compared to binary-coded data.

Following low-pass filtering, the filtered image 810 is then processed (at 812) to locate the targets 301. This may consist of a search for target features whose spatial inter-relationship is consistent with the known geometry of the tag pattern. Candidate targets may be identified directly from maxima in the filtered image 810, or may be the subject of further characterization and matching, such as via their (binary or grayscale) shape moments (typically computed from pixels in the enhanced image 806 based on local maxima in the filtered image 810), as described in U.S. Pat. No. 7,055,739, the contents of which is herein incorporated by reference.

The identified targets 301 are then assigned to a target grid 816. Each cell of the grid 816 contains a symbol group 303, and several symbol groups will of course be visible in the image. At this stage, individual tags 4 will not be identifiable in the target grid 816, since the targets 301 do not demarcate one tag from another.

To allow macrodot values to be sampled accurately, the perspective transform of the captured image must be inferred. Four of the targets 301 are taken to be the perspective-distorted corners of a square of known size in tag space, and the eight-degree-of-freedom perspective transform 822 is inferred (at 820), based on solving the well-understood equations relating the four tag-space and image-space point pairs.

Calculation of the 2D perspective transform is described in detail in, for example, Applicant's U.S. Pat. No. 6,832,717, the contents of which is herein incorporated by reference.

Since each image will contain at least 9, at least 16 or at least 25 targets arranged in a square grid, the accuracy of calculating the 2D perspective transform is improved compared to the Applicant's previous tag designs described in, for example, U.S. Pat. No. 6,832,717. Hence, more accurate position calculation can be achieved with the tag design of the present invention.

The inferred tag-space to image-space perspective transform 822 is used to project each known macrodot position in tag space into image space. Since all bits in the tags are represented by PPM-encoding, the presence or absence of each macrodot 302 can be determined using a local intensity reference, rather than a separate intensity reference. Thus, PPM-encoding provides improved data sampling compared with pure binary encoding.

The next stage determines the orientation of the tag(s), or portions thereof, in the field of view. At least 3 orientation codewords are sampled and decoded (at 824) to provide the orientation 826. Robust orientation determination is provided since many symbol groups 303 are contained in the image, with each symbol group containing an orientation symbol, as described above. Moreover, and as described in Section 2.5.1, since N orientation symbols in a tag form a code with minimum distance N, the code is capable of correcting (N−1)/2 errors. Hence, orientation determination is very robust and capable of correcting errors, depending on the number of orientation symbols sampled.

After determination of the orientation 826, the next stage samples and decodes two or more orthogonal translation codewords (at 828) to determine the relative translation 830 of tags(s) in the field of view relative to the target grid. This enables alignment of the tags 4 with the target grid 818, thereby allowing individual tag(s), or portions thereof, to be distinguished in the coding pattern 3 in the field of view. Since each symbol group 303 contains a translation code, multiple translation codes can be sampled to provide robust translation determination. As described in Section 2.5.2, the translation code is a cyclic position code. Since each row and each column of a tag contains M symbol groups, the code has minimum distance M×M. This allows very robust determination of the alignment of tags 4 with the target grid 818. The alignment needs to be both robust and accurate since there are many possible alignments when each tag 4 contains multiple symbol groups 303.

Once initial imaging and decoding has yielded the 2D perspective transform, the orientation, and the translation of tag(s) relative to the target grid, the data codewords 304 can then be sampled and decoded 836 to yield the requisite decoded codewords 838.

Decoding of the data codewords 304 typically proceeds as follows:

sample and decode local Reed-Solomon codeword
determine tag x-y location from codeword
determine nib x-y location from tag x-y location and perspective transform
determine active area status of nib location with reference to active area flag
sample common Reed-Solomon codewords
decode common Reed-Solomon codewords
verify tag data CRC
on decode error flag bad region ID sample
determine encoding type, and reject unknown encoding
determine region flags
determine region ID encode region ID, nib x-y location, and nib active area status in digital ink ("interaction data")

route digital ink based on region flags.

The skilled person will appreciate that the decoding sequence described above represents one embodiment of the present invention. It will, of course, be appreciated that the interaction data sent from the pen 400 to the netpage system may include other data e.g. digital signature from embedded data (see Section 2.8.4), MIME data (see Section 2.8.5), pen mode (see US 2007/125860), orientation data, pen ID, nib ID etc.

An example of interpreting interaction data, received by the netpage system from the netpage pen 400, is discussed briefly above. A more detailed discussion of how the netpage system may interpret interaction data can be found in the Applicant's previously-filed applications (see, for example, US 2007/130117 and US 2007/108285, the contents of which are herein incorporated by reference).

3. Netpage Pen

3.1 Functional Overview

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). For a description of various netpage sensing devices, reference is made to U.S. Pat. No. 7,105,753; U.S. Pat. No. 7,015,901; U.S. Pat. No. 7,091,960; and US Publication No. 2006/0028459, the contents of each of which are herein incorporated by reference.

It will be appreciated that the present invention may utilize any suitable optical reader. However, the Netpage pen 400 will be described herein as one such example.

The Netpage pen 400 is a motion-sensing writing instrument which works in conjunction with a tagged Netpage surface (see Section 2). The pen incorporates a conventional ballpoint pen cartridge for marking the surface, an image sensor and processor for simultaneously capturing the absolute path of the pen on the surface and identifying the surface, a force sensor for simultaneously measuring the force exerted on the nib, and a real-time clock for simultaneously measuring the passage of time.

While in contact with a tagged surface, as indicated by the force sensor, the pen continuously images the surface region adjacent to the nib, and decodes the nearest tag in its field of view to determine both the identity of the surface, its own instantaneous position on the surface and the pose of the pen. The pen thus generates a stream of timestamped position samples relative to a particular surface, and transmits this stream to the Netpage server 10. The sample stream describes a series of strokes, and is conventionally referred to as digital ink (DInk). Each stroke is delimited by a pen down and a pen up event, as detected by the force sensor. More generally, any data resulting from an interaction with a Netpage, and transmitted to the Netpage server 10, is referred to herein as "interaction data".

The pen samples its position at a sufficiently high rate (nominally 100 Hz) to allow a Netpage server to accurately reproduce hand-drawn strokes, recognise handwritten text, and verify hand-written signatures.

The Netpage pen also supports hover mode in interactive applications. In hover mode the pen is not in contact with the paper and may be some small distance above the surface of the paper (or other substrate). This allows the position of the pen, including its height and pose to be reported. In the case of an interactive application the hover mode behaviour can be used to move a cursor without marking the paper, or the distance of the nib from the coded surface could be used for tool behaviour control, for example an air brush function.

The pen includes a Bluetooth radio transceiver for transmitting digital ink via a relay device to a Netpage server. When operating offline from a Netpage server the pen buffers captured digital ink in non-volatile memory. When operating online to a Netpage server the pen transmits digital ink in real time.

The pen is supplied with a docking cradle or "pod". The pod contains a Bluetooth to USB relay. The pod is connected via a USB cable to a computer which provides communications support for local applications and access to Netpage services.

The pen is powered by a rechargeable battery. The battery is not accessible to or replaceable by the user. Power to charge the pen can be taken from the USB connection or from an external power adapter through the pod. The pen also has a power and USB-compatible data socket to allow it to be externally connected and powered while in use.

The pen cap serves the dual purpose of protecting the nib and the imaging optics when the cap is fitted and signalling the pen to leave a power-preserving state when uncapped.

3.2 Ergonomics and Layout

Figure 19:
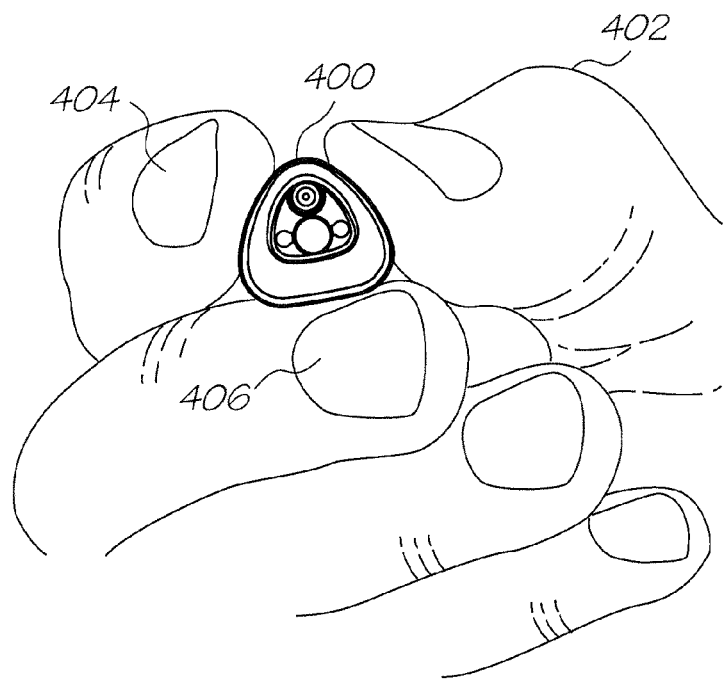
FIG. 19 shows a nib and elevation of the pen held by a user.

FIG. 19 shows a rounded triangular profile gives the pen 400 an ergonomically comfortable shape to grip and use the pen in the correct functional orientation. It is also a practical shape for accommodating the internal components. A normal pen-like grip naturally conforms to a triangular shape between thumb 402, index finger 404 and middle finger 406.

Figure 20:
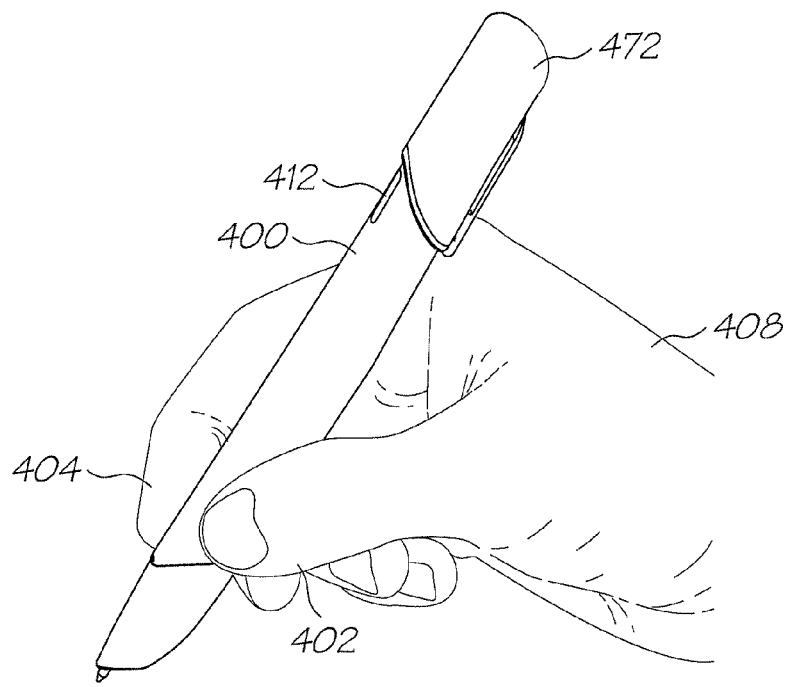
FIG. 20 shows the pen held by a user at a typical incline to a writing surface.

As shown in FIG. 20, a typical user writes with the pen 400 at a nominal pitch of about 30 degrees from the normal toward the hand 408 when held (positive angle) but seldom operates a pen at more than about 10 degrees of negative pitch (away from the hand). The range of pitch angles over which the pen 400 is able to image the pattern on the paper has been optimised for this asymmetric usage. The shape of the pen 400 helps to orient the pen correctly in the user's hand 408 and to discourage the user from using the pen "upside-down". The pen functions "upside-down" but the allowable tilt angle range is reduced.

The cap 410 is designed to fit over the top end of the pen 400, allowing it to be securely securely stowed while the pen is in use. Multi colour LEDs illuminate a status window 412 in the top edge (as in the apex of the rounded triangular cross section) of the pen 400 near its top end. The status window 412 remains un-obscured when the cap is stowed. A vibration motor is also included in the pen as a haptic feedback system (described in detail below).

Figure 21:
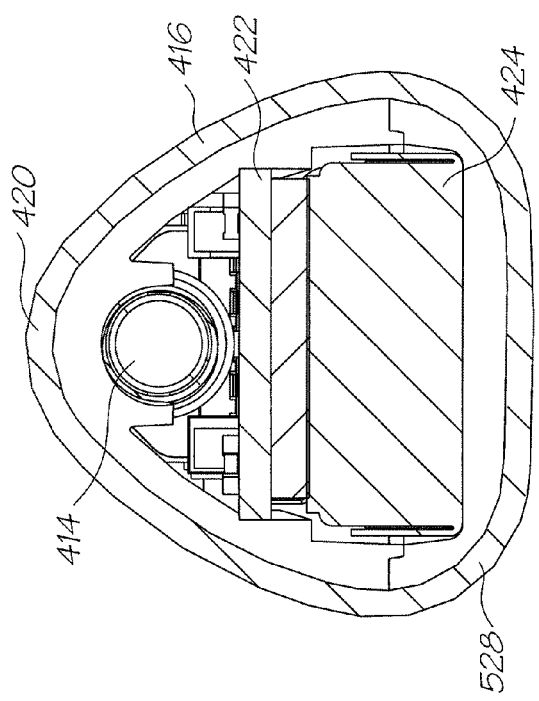
FIG. 21 is a lateral cross section through the pen.

As shown in FIG. 21, the grip portion of the pen has a hollow chassis molding 416 enclosed by a base molding 528 to house the other components. The ink cartridge 414 for the ball point nib (not shown) fits naturally into the apex 420 of the triangular cross section, placing it consistently with the user's grip. This in turn provides space for the main PCB 422 in the centre of the pen and for the battery 424 in the base of the pen. By referring to FIG. 22Aa, it can be seen that this also naturally places the tag-sensing optics 426 unobtrusively below the nib 418 (with respect to nominal pitch). The nib molding 428 of the pen 400 is swept back below the ink cartridge 414 to prevent contact between the nib molding 428 and the paper surface when the pen is operated at maximum pitch.

As best shown in FIG. 22B, the imaging field of view 430 emerges through a centrally positioned IR filter/window 432 below the nib 418, and two near-infrared illumination LEDs 434, 436 emerge from the two bottom corners of the nib molding 428. Each LED 434, 436 has a corresponding illumination field 438, 440.

As the pen is hand-held, it may be held at an angle that causes reflections from one of the LED's that are detrimental to the image sensor. By providing more than one LED, the LED causing the offending reflections can be extinguished.

Specific details of the pen mechanical design can be found in US Publication No. 2006/0028459, the contents of which are herein incorporated by reference.

3.3 Pen Feedback Indications

Figure 23:
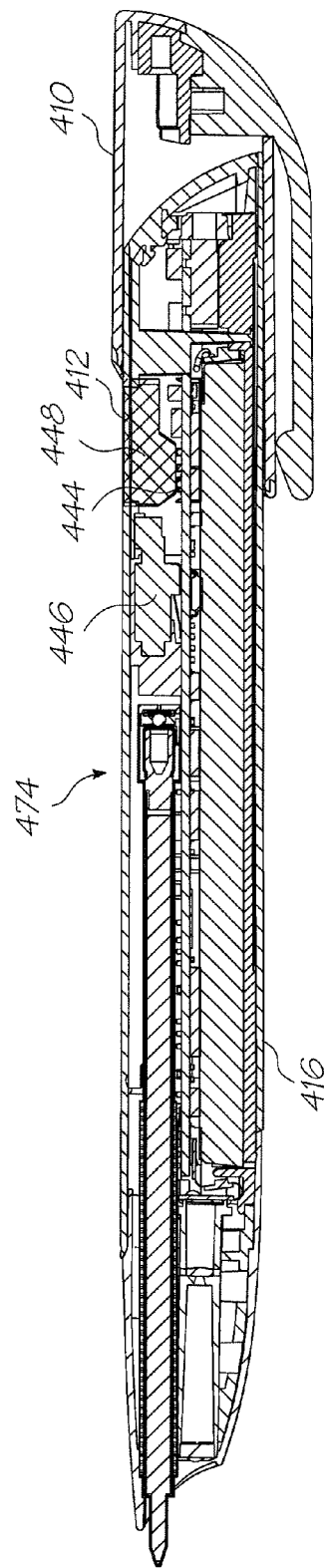
FIG. 23 is a longitudinal cross section of the pen.

FIG. 23 is a longitudinal cross section through the centreline of the pen 400 (with the cap 410 stowed on the end of the pen). The pen incorporates red and green LEDs 444 to indicate several states, using colours and intensity modulation. A light pipe 448 on the LEDs 444 transmit the signal to the status indicator window 412 in the tube molding 416. These signal status information to the user including power-on, battery level, untransmitted digital ink, network connection on-line, fault or error with an action, detection of an "active area" flag, detection of an "embedded data" flag, further data sampling to required to acquire embedded data, acquisition of embedded data completed etc.

A vibration motor 446 is used to haptically convey information to the user for important verification functions during transactions. This system is used for important interactive interactive indications that might be missed due to inattention to the LED indicators 444 or high levels of ambient light. The haptic system indicates to the user when:

The pen wakes from standby mode
There is an error with an action
To acknowledge a transaction

3.4 Pen Optics

The pen incorporates a fixed-focus narrowband infrared imaging system. It utilizes a camera with a short exposure time, small aperture, and bright synchronised illumination to capture sharp images unaffected by defocus blur or motion blur.

TABLE 6

Optical Specifications

| | |
|---|---|
| Magnification | −0.225 |
| Focal length of lens | 6.0 mm |
| Viewing distance | 30.5 mm |
| Total track length | 41.0 mm |
| Aperture diameter | 0.8 mm |
| Depth of field | −/6.5 mm |
| Exposure time | 200 us |
| Wavelength | 810 nm |
| Image sensor size | 140 × 140 pixels |
| Pixel size | 10 um |
| Pitch range | −15 to 45 deg |
| Roll range | −30 to 30 deg |
| Yaw range | 0 to 360 deg |
| Minimum sampling rate | 2.25 pixels per macrodot |
| Maximum pen velocity | 0.5 m/s |

[1]Allowing 70 micron blur radius
[2]Illumination and filter
[3]Pitch, roll and yaw are relative to the axis of the pen Cross sections showing the pen optics are provided in FIGS. 24A and 24B. An image of the Netpage tags printed on a surface 548 adjacent to the nib 418 is focused by a lens 488 onto the active region of an image sensor 490. A small aperture 494 ensures the available depth of field accommodates the required pitch and roll ranges of the pen 400.

First and second LEDs 434 and 436 brightly illuminate the surface 549 within the field of view 430. The spectral emission peak of the LEDs is matched to the spectral absorption peak of the infrared ink used to print Netpage tags to maximise contrast in captured images of tags. The brightness of the LEDs is matched to the small aperture size and short exposure time required to minimise defocus and motion blur.

A longpass IR filter 432 suppresses the response of the image sensor 490 to any coloured graphics or text spatially coincident with imaged tags and any ambient illumination below the cut-off wavelength of the filter 432. The transmission of the filter 432 is matched to the spectral absorption peak of the infrared ink to maximise contrast in captured images of tags.

The filter also acts as a robust physical window, preventing contaminants from entering the optical assembly 470.

3.5 Pen Imaging System

Figure 25:
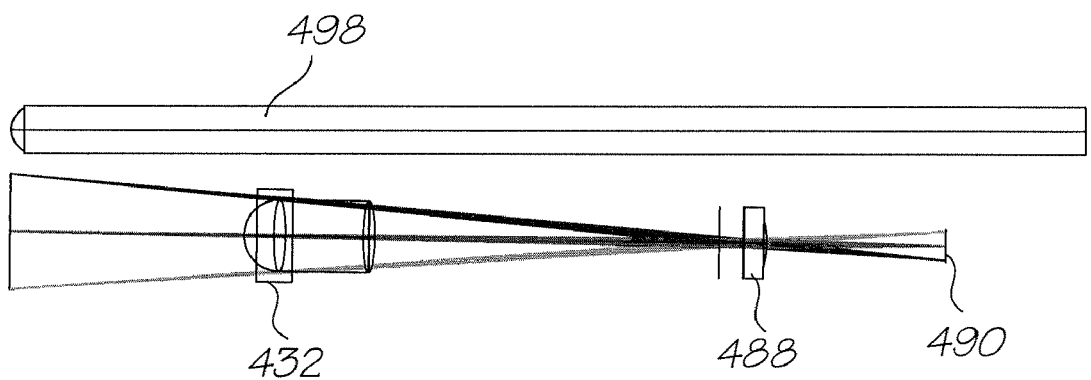
FIG. 25 is a ray trace of the pen optics adjacent a sketch of the ink cartridge.
Figure 26:
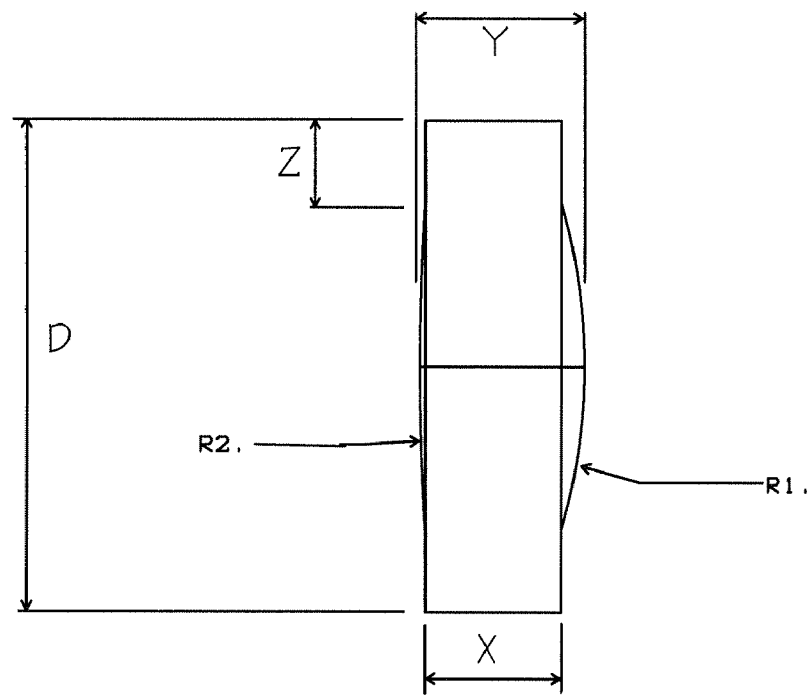
FIG. 26 is a side elevation of the lens.

A ray trace of the optic path is shown in FIG. 25. The image sensor 490 is a CMOS image sensor with an active region of 140 pixels squared. Each pixel is 10 µm squared, with a fill factor of 93%. Turning to FIG. 26, the lens 488 is shown in detail. The dimensions are:

D=3 mm
R1=3.593 mm
R2=15.0 mm
X=0.8246 mm
Y=1.0 mm
Z=0.25 mm

This gives a focal length of 6.15 mm and transfers the image from the object plane (tagged surface 548) to the image plane (image sensor 490) with the correct sampling frequency to successfully decode all images over the specified pitch, roll and yaw ranges. The lens 488 is biconvex, with the most curved surface facing the image sensor. The minimum imaging field of view 430 required to guarantee acquisition of sufficient tag data with each interaction is dependent on the specific coding pattern. The required field of view for the coding pattern of the present invention is described in Section 2.9.

The required paraxial magnification of the optical system is defined by the minimum spatial sampling frequency of 2.25 pixels per macrodot for the fully specified tilt range of the pen 400, for the image sensor 490 of 10 µm pixels. Typically, the imaging system employs a paraxial magnification of 0.225, the ratio of the diameter of the inverted image at the image sensor to the diameter of the field of view at the object plane, on an image sensor 490 of minimum 128×128 pixels. The image sensor 490 however is 140×140 pixels, in order to accommodate manufacturing tolerances. This allows up to +/−120 µm (12 pixels in each direction in the plane of the image sensor) of misalignment between the optical axis and the image sensor axis without losing any of the information in the field of view.

The lens 488 is made from Poly-methyl-methacrylate (PMMA), typically used for injection moulded optical components. PMMA is scratch resistant, and has a refractive index of 1.49, with 90% transmission at 810 nm. The lens is biconvex to assist moulding precision and features a mounting surface to precisely mate the lens with the optical barrel molding 492.

A 0.8 mm diameter aperture 494 is used to provide the depth of field requirements of the design.

The specified tilt range of the pen is 15.0 to 45.0 degree pitch, with a roll range of 30.0 to 30.0 degrees. Tilting the pen through its specified range moves the tilted object plane up to 6.3 mm away from the focal plane. The specified aperture thus provides a corresponding depth of field of 6.5 mm, with an acceptable blur radius at the image sensor of 16 µm.

Due to the geometry of the pen design, the pen operates correctly over a pitch range of 33.0 to 45.0 degrees.

Figure 27:
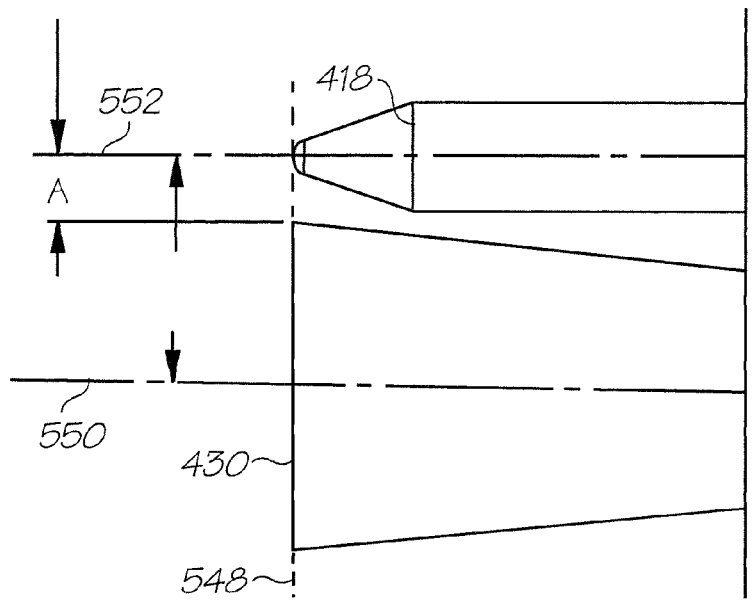
FIG. 27 is a side elevation of the nib and the field of view of the optical sensor.

Referring to FIG. 27, the optical axis 550 is pitched 0.8 degrees away from the nib axis 552. The optical axis and the nib axis converge toward the paper surface 548. With the nib axis 552 perpendicular to the paper, the distance A between the edge of the field of view 430 closest to the nib axis and the nib axis itself is 1.2 mm.

The longpass IR filter 432 is made of CR-39, a lightweight thermoset plastic heavily resistant to abrasion and chemicals such as acetone. Because of these properties, the filter also serves as a window. The filter is 1.5 mm thick, with a refractive index of 1.50. Each filter may be easily cut from a large sheet using a $CO_2$ laser cutter.

3.6 Electronics Design

TABLE 3

Electrical Specifications

| | |
|---|---|
| Processor | ARM7 (Atmel AT91FR40162) running at 80 MHz with 256 kB SRAM and 2 MB flash memory |
| Digital ink storage capacity | 5 hours of writing |
| Bluetooth Compliance | 1.2 |
| USB Compliance | 1.1 |
| Battery standby time | 12 hours (cap off), >4 weeks (cap on) |
| Battery writing time | 4 hours of cursive writing (81% pen down, assuming easy offload of digital ink) |
| Battery charging time | 2 hours |
| Battery Life | Typically 300 charging cycles or 2 years (whichever occurs first) to 80% of initial capacity. |
| Battery Capacity/Type | ~340 mAh at 3.7 V, Lithium-ion Polymer (LiPo) |

Figure 28:
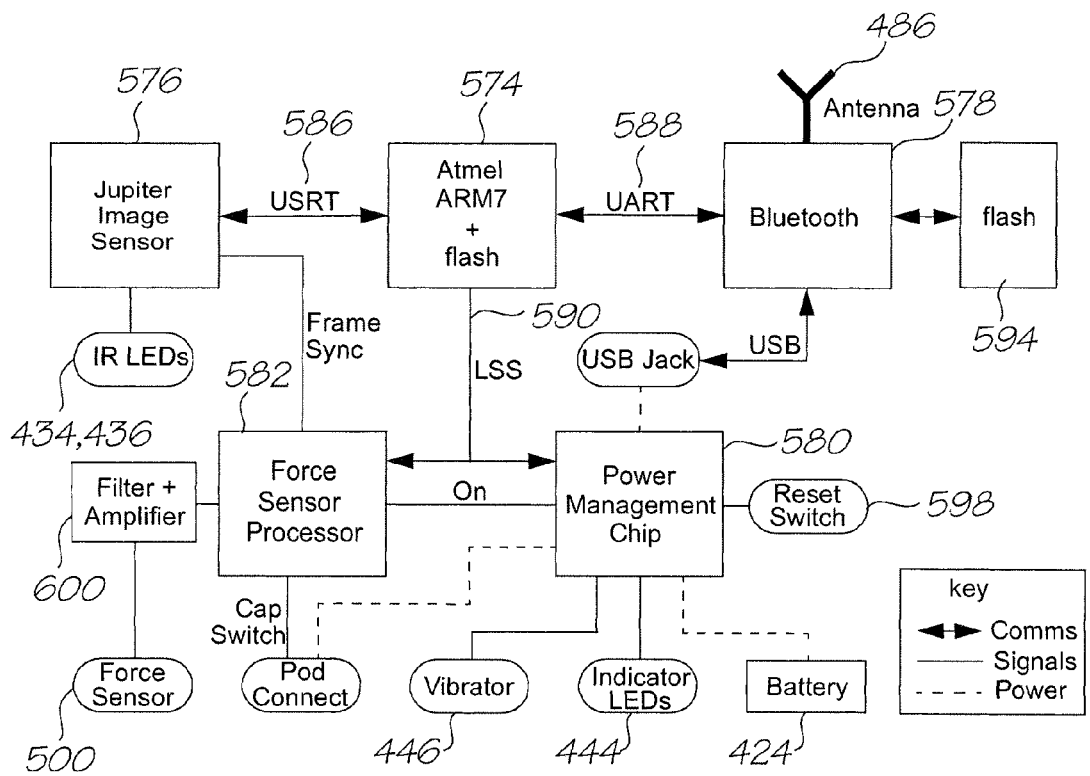
FIG. 28 is a block diagram of the pen electronics.

FIG. 28 is a block diagram of the pen electronics. The electronics design for the pen is based around five main sections. These are:
- the main ARM7 microprocessor 574,
- the image sensor and image processor 576,
- the Bluetooth communications module 578,
- the power management unit IC (PMU) 580 and
- the force sensor microprocessor 582.

3.6.1 Microprocessor

The pen uses an Atmel AT91FR40162 microprocessor (see Atmel, *AT91 ARM Thumb Microcontrollers—AT91FR40162 Preliminary*, http://www.keil.com/dd/docs/datashts/atmel/at91fr40162.pdf) running at 80 MHz. The AT91FR40162 incorporates an ARM7 microprocessor, 256 kBytes of on-chip single wait state SRAM and 2 MBytes of external flash memory in a stack chip package.

This microprocessor 574 forms the core of the pen 400. Its duties include:
- setting up the Jupiter image sensor 584,
- decoding images of Netpage coding pattern (see Section 2.9), with assistance from the image processing features of the image sensor 584, for inclusion in the digital ink stream along with force sensor data received from the force sensor microprocessor 582,
- setting up the power management IC (PMU) 580,
- compressing and sending digital ink via the Bluetooth communications module 578, and
- programming the force sensor microprocessor 582.

The ARM7 microprocessor 574 runs from an 80 MHz oscillator. It communicates with the Jupiter image sensor 576 using a Universal Synchronous Receiver Transmitter (USRT) 586 with a 40 MHz clock. The ARM7 574 communicates with the Bluetooth module 578 using a Universal Asynchronous Receiver Transmitter (UART) 588 running at 115.2 kbaud. Communications to the PMU 580 and the Force Sensor microprocessor (FSP) 582 are performed using a Low Speed Serial bus (LSS) 590. The LSS is implemented in software and uses two of the microprocessor's general purpose IOs.

The ARM7 microprocessor 574 is programmed via its JTAG port.

3.6.2 Image Sensor

The 'Jupiter' Image Sensor 584 (see US Publication No. 2005/0024510, the contents of which are incorporated herein by reference) contains a monochrome sensor array, an analogue to digital converter (ADC), a frame store buffer, a simple image processor and a phase lock loop (PLL). In the pen, Jupiter uses the USRT's clock line and its internal PLL to generate all its clocking requirements. Images captured by the sensor array are stored in the frame store buffer. These images are decoded by the ARM7 microprocessor 574 with help from the 'Callisto' image processor contained in Jupiter. The Callisto image processor performs, inter alia, low-pass filtering of captured images (see Section 2.9 and US Publication No. 2005/0024510) before macrodot sampling and decoding by the microprocessor 574.

Jupiter controls the strobing of two infrared LEDs 434 and 436 at the same time as its image array is exposed. One or other of these two infrared LEDs may be turned off while the image array is exposed to prevent specular reflection off the paper that can occur at certain angles.

3.6.3 Bluetooth Communications Module

The pen uses a CSR BlueCore4-External device (see CSR, *BlueCore4-External Data Sheet rev c*, 6 Sep. 2004) as the Bluetooth controller 578. It requires an external 8 Mbit flash memory device 594 to hold its program code. The BlueCore4 meets the Bluetooth v1.2 specification and is compliant to v0.9 of the Enhanced Data Rate (EDR) specification which allows communication at up to 3 Mbps.

A 2.45 GHz chip antenna 486 is used on the pen for the Bluetooth communications.

The BlueCore4 is capable of forming a UART to USB bridge. This is used to allow USB communications via data/power socket 458 at the top of the pen 456.

Alternatives to Bluetooth include wireless LAN and PAN standards such as IEEE 802.11 (Wi-Fi) (see IEEE, 802.11 *Wireless Local Area Networks*, http://grouper.ieee.org/groups/802/11/index.html), IEEE 802.15 (see IEEE, 802.15 *Working Group for WPAN*, http://grouper.ieee.org/groups/802/15/index.html), ZigBee (see ZigBee Alliance, http://www.zigbee.org), and WirelessUSB Cypress (see *WirelessUSB LR 2.4-GHz DSSS Radio SoC*, http://www.cypress.com/cfuploads/img/products/cywusb6935.pdf), as well as mobile standards such as GSM (see GSM Association, http://www.gsmworld.com/index.shtml), GPRS/EDGE, *GPRS Platform*, http://www.gsmworld.com/technology/gprs/index.shtml), CDMA (see CDMA Development Group, http://www.cdg.org/, and Qualcomm, http://www.qualcomm.com), and UMTS (see 3rd Generation Partnership Project (3GPP), http://www.3gpp.org).

3.6.4 Power Management Chip

The pen uses an Austria Microsystems AS3603 PMU 580 (see Austria Microsystems, *AS3603 Multi-Standard Power Management Unit Data Sheet v2.0*). The PMU is used for battery management, voltage generation, power up reset generation and driving indicator LEDs and the vibrator motor.

The PMU 580 communicates with the ARM7 microprocessor 574 via the LSS bus 590.

3.6.5 Force Sensor Subsystem

The force sensor subsystem comprises a custom Hokuriku force sensor 500 (based on Hokuriku, *HFD-500 Force Sensor*, http://www.hdk.cojp/pdf/eng/e1381AA.pdf), an amplifier and low pass filter 600 implemented using op-amps and a force sensor microprocessor 582.

The pen uses a Silicon Laboratories C8051F330 as the force sensor microprocessor 582 (see Silicon Laboratories, *C8051F330/1 MCU Data Sheet, rev 1.1*). The C8051F330 is an 8051 microprocessor with on chip flash memory, 10 bit ADC and 10 bit DAC. It contains an internal 24.5 MHz oscillator and also uses an external 32.768 kHz tuning fork.

The Hokuriku force sensor 500 is a silicon piezoresistive bridge sensor. An op-amp stage 600 amplifies and low pass (anti-alias) filters the force sensor output. This signal is then sampled by the force sensor microprocessor 582 at 5 kHz.

Alternatives to piezoresistive force sensing include capacitive and inductive force sensing (see Wacom, "Variable capacity condenser and pointer", US Patent Application 20010038384, filed 8 Nov. 2001, and Wacom, *Technology*, http://www.wacom-components.com/english/tech.asp).

The force sensor microprocessor 582 performs further (digital) filtering of the force signal and produces the force sensor values for the digital ink stream. A frame sync signal from the Jupiter image sensor 576 is used to trigger the generation of each force sample for the digital ink stream. The temperature is measured via the force sensor microprocessor's 582 on chip temperature sensor and this is used to compensate for the temperature dependence of the force sensor and amplifier. The offset of the force signal is dynamically controlled by input of the microprocessor's DAC output into the amplifier stage 600.

The force sensor microprocessor 582 communicates with the ARM7 microprocessor 574 via the LSS bus 590. There are two separate interrupt lines from the force sensor microprocessor 582 to the ARM7 microprocessor 574. One is used to indicate that a force sensor sample is ready for reading and the other to indicate that a pen down/up event has occurred.

The force sensor microprocessor flash memory is programmed in-circuit by the ARM7 microprocessor 574.

The force sensor microprocessor 582 also provides the real time clock functionality for the pen 400. The RTC function is performed in one of the microprocessor's counter timers and runs from the external 32.768 kHz tuning fork. As a result, the force sensor microprocessor needs to remain on when the cap 472 is on and the ARM7 574 is powered down. Hence the force sensor microprocessor 582 uses a low power LDO separate from the PMU 580 as its power source. The real time clock functionality includes an interrupt which can be programmed to power up the ARM7 574.

The cap switch 602 is monitored by the force sensor microprocessor 582. When the cap assembly 472 is taken off (or there is a real time clock interrupt), the force sensor microprocessor 582 starts up the ARM7 572 by initiating a power on and reset cycle in the PMU 580.

3.7 Pen Software

The Netpage pen software comprises that software running on microprocessors in the Netpage pen 400 and Netpage pod.

The pen contains a number of microprocessors, as detailed in Section 3.6. The Netpage pen software includes software running on the Atmel ARM7 CPU 574 (hereafter CPU), the Force Sensor microprocessor 582, and also software running in the VM on the CSR BlueCore Bluetooth module 578 (hereafter pen BlueCore). Each of these processors has an associated flash memory which stores the processor specific software, together with settings and other persistent data. The pen BlueCore 578 also runs firmware supplied by the module manufacturer, and this firmware is not considered a part of the Netpage pen software.

The pod contains a CSR BlueCore Bluetooth module (hereafter pod BlueCore). The Netpage pen software also includes software running in the VM on the pod BlueCore.

As the Netpage pen 400 traverses a Netpage tagged surface 548, a stream of correlated position and force samples are produced. This stream is referred to as DInk. Note that DInk may include samples with zero force (so called "Hover DInk") produced when the Netpage pen is in proximity to, but not marking, a Netpage tagged surface.

The CPU component of the Netpage pen software is responsible for DInk capture, tag image processing and decoding (in conjunction with the Jupiter image sensor 576), storage and offload management, host communications, user feedback and software upgrade. It includes an operating system (RTOS) and relevant hardware drivers. In addition, it provides a manufacturing and maintenance mode for calibration, configuration or detailed (non-field) fault diagnosis. The Force Sensor microprocessor 582 component of the Netpage pen software is responsible for filtering and preparing force samples for the main CPU. The pen BlueCore VM software is responsible for bridging the CPU UART 588 interface to USB when the pen is operating in tethered mode. The pen BlueCore VM software is not used when the pen is operating in Bluetooth mode.

The pod BlueCore VM software is responsible for sensing when the pod is charging a pen 400, controlling the pod LEDs appropriately, and communicating with the host PC via USB.

For a detailed description of the software modules, reference is made to US Publication No. 2006/0028459, the contents of which are herein incorporated by reference.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for imaging a coding pattern disposed on a surface of a substrate, said system comprising:
    (A) said substrate, wherein said coding pattern comprises:
        a plurality of target elements defining a target grid, said target grid comprising a plurality of cells, wherein neighboring cells share target elements;
        a plurality of data elements contained in each cell; and
        a plurality of tags, each tag being defined by a plurality of contiguous cells, each tag comprising respective local tag data encoded by a respective set of said data elements, each tag comprising at least 9 target elements;
    (B) an optical reader comprising:
        an image sensor for capturing an image of a portion of said coding pattern, said image sensor having a field-of-view of at least one tag diameter and less than two tag diameters;
        a nib; and
        a processor configured for performing the steps of:
            (i) locating at least 9 target elements in said field-of-view;
            (ii) observing a perspective distortion of said target elements due to a 3D orientation of said reader relative to said surface;
            (iii) calculating a 2D perspective transform using said target elements; and
            (iv) determining a position of said nib on said surface using at least said 2D perspective transform and said local tag data.

2. The system of claim 1, wherein each tag comprises at least 16 target elements and said processor is configured for locating at least 16 target elements.

3. The system of claim 1, wherein each tag comprises at least 25 target elements and said processor is configured for locating at least 25 target elements.

4. The system of claim 1, wherein each tag is square and comprises $M^2$ contiguous square cells, wherein M is an integer having a value of at least 2.

5. The system of claim 1, wherein said processor is configured for low-pass filtering said captured image so as to obscure said data elements and preserve said target elements.

6. The system of claim 1, wherein said target elements are target dots and said data elements are macrodots.

7. The system of claim 6, wherein said reader is an optically imaging pen.

\* \* \* \* \*